US005132627A

United States Patent [19]

Popovic et al.

[11] Patent Number: 5,132,627

[45] Date of Patent: Jul. 21, 1992

[54] MOTIONLESS SCANNER

[75] Inventors: Zoran D. Popovic, Mississauga, Canada; Damodar M. Pai, Fairport, N.Y.; Merlin E. Scharfe, Penfield, N.Y.; Satchidanand Mishra, Webster, N.Y.; Edward A. Domm, Hilton, N.Y.

[73] Assignee: Xerox Corporation, Stamford, Conn.

[21] Appl. No.: 636,045

[22] Filed: Dec. 28, 1990

[51] Int. Cl.[5] .............................................. G01N 27/60

[52] U.S. Cl. .................................... 324/452; 355/203; 430/31; 430/55; 324/457

[58] Field of Search ................ 118/644, 647; 355/203, 355/214; 430/31, 55, 57, 58; 324/452, 457

[56] References Cited

U.S. PATENT DOCUMENTS

| | | | |
|---|---|---|---|
| 3,121,006 | 2/1964 | Middleton et al. | 96/1 |
| 3,357,989 | 12/1967 | Byrne et al. | 260/314.5 |
| 3,442,781 | 5/1969 | Weinberger | 204/181 |
| 3,866,114 | 2/1975 | Johnston | 324/452 X |
| 3,898,001 | 8/1975 | Hardenbrook et al. | 355/3 R |
| 4,134,137 | 1/1979 | Jacobs et al. | 358/293 |
| 4,233,384 | 11/1980 | Turner et al. | 430/59 |
| 4,265,990 | 5/1981 | Stolka et al. | 430/59 |
| 4,286,033 | 8/1981 | Neyhart et al. | 430/58 |
| 4,291,110 | 9/1981 | Lee | 430/59 |
| 4,298,669 | 11/1981 | Marushima et al. | 430/55 |
| 4,299,897 | 11/1981 | Stolka et al. | 430/59 |
| 4,306,008 | 12/1981 | Pai et al. | 430/59 |
| 4,319,544 | 3/1982 | Weber | 118/647 |
| 4,338,387 | 7/1982 | Hewitt | 430/58 |
| 4,415,639 | 11/1983 | Horgan | 430/57 |
| 4,439,507 | 3/1984 | Pan et al. | 430/59 |
| 4,510,443 | 4/1985 | Inaba et al. | 324/457 X |
| 4,512,652 | 4/1985 | Buck et al. | 355/219 |
| 4,654,284 | 3/1987 | Yu et al. | 430/59 |

OTHER PUBLICATIONS

Z. D. Popovic, D. Parco and P. Iglesias, SPIE vol. 1253 Hard Copy and Printing Materials, Media and Processes, 175 (1990).

M. Stolka, J. F. Yanus and D. M. Pai, J. Phys. Chem., 1984, 88, 4707–4714, Hole Transport in Solid Solutions of Diamine and Polycarbonate.

(List continued on next page.)

*Primary Examiner*—R. L. Moses
*Assistant Examiner*—P. Stanzione

[57] ABSTRACT

A process is disclosed for ascertaining electrical discharge properties of an electrophotographic imaging member including the steps of (a) providing at least one electrophotographic imaging member comprising an electrically conductive layer and at least one photoconductive layer, (b) contacting the surface of the electrophotographic imaging member with a substantially transparent electrode and applying an electric potential or an electric current to form an electric field across the photoconductive layer, (c) terminating the applying of the electric potential or the electric current, (d) exposing the photoconductive layer to activating radiation to discharge the electrophotographic imaging member, (e) repeating steps (b), (c) and (d), and (f) measuring the potential across the photoconductive layer during steps (b), (c) and (d) as a function of time by means of an electrostatic meter coupled to the electrode. Also, disclosed is apparatus for ascertaining electrical discharge properties of an electrophotographic imaging member including (a) means to support an electrophotographic imaging member comprising an electrically conductive layer and at least one photoconductive layer, (b) means for applying an electric potential or electric current to a substantially transparent electrode on the electrophotographic imaging member to form an electric field across the photoconductive layer, (c) means for terminating the applying of the electric potential or the electric current, (d) an electrostatic voltmeter probe coupled to the means for applying an electric current to the electrode, (e) means for exposing the photoconductive layer through the substantially transparent electrode to activating radiation to discharge the electrophotographic imaging member to a predetermined level, and (f) means for exposing the photoconductive layer to activating radiation to fully discharge the electrophotographic imaging member.

33 Claims, 5 Drawing Sheets

OTHER PUBLICATIONS

Zoran Popovic, Pablo Iglesias, "Characterization of Microscopic Electrical Non-Uniformities in Xerographic Photoreceptors", Fifth International Congress on Advances and Non-Impact Printing Technologies, Nov. 12-17, 1989, San Diego, CA.

Zoran Popovic, Dave Parco, Pablo Iglesia, "Nature of Microscopic Electrical Defects in Organic Photoreceptors", Proceedings SPIE-SPSE Electronic Imaging Science and Technology Symposium, Feb. 11-16, 1990 Santa Clara, CA.

R. Gerhard-Multhaupt and W. Perry, J. Phys. E; Sci. Instrum. 16, 421-422 (1983).

E. J. Yarmchuck and G. E. Keefe, J. Appl. Phys. 66(11), 1 Dec. 1989.

MOTIONLESS SCANNER

BACKGROUND OF THE INVENTION

This invention relates in general to ascertaining electrical discharge properties of electrophotographic imaging members and more specifically, to apparatus and process for measuring the potential across a photoconductive layer during cycling using an electrostatic meter.

In the art of electrophotography an electrophotographic plate comprising a photoconductive insulating layer on a conductive layer is image by first uniformly electrostatically charging the imaging surface of the photoconductive insulating layer. The plate is then exposed to a pattern of activating electromagnetic radiation such a light, which selectively dissipates the charge in the illuminated areas of the photoconductive insulating layer while leaving behind an electrostatic latent image in the non-illuminated area. This electrostatic latent image may then be developed to form a visible image by depositing finely divided electroscopic toner particles on the surface of the photoconductive insulating layer. The resulting visible toner image can be transferred to a suitable receiving member such as paper. This imaging process may be repeated many times with reusable photoconductive insulating layers.

The flexible photoreceptor belts are usually multilayered and comprise a substrate, a conductive layer, an optional hole blocking layer, an optional adhesive layer, a charge generating layer, and a charge transport layer and, in some embodiments, and anti-curl backing layer.

Although excellent toner images may be obtained with multilayered belt photoreceptors, it has been found that as more advanced, higher speed electrophotographic copiers, duplicators and printers were developed, there is a need to better characterize the photoreceptors. The photoreceptor characteristics that have a bearing on the ultimate print quality include: charge acceptance when contacted with a given charge, the dark decay in the rested (first cycle) and fatigued state (steady state after a few cycle), the discharge of Photo Induced Discharge Characteristics (PIDC) which is the relationship between the potential remaining as a function of light intensity, the spectral response characteristics, and the residual potential in addition, during cyclic operation in apparatus such as a copier, duplicator of printer, a photoreceptor may undergo conditions known as cycle-up or cycle-down. Cycle-up is a phenomenon in which residual potential and or background potential keeps increasing as a function of cycles. This generally leads to increased and unacceptable background density in copies of the documents. Cycle-down is a phenomenon in which the dark development potential (potential corresponding to unexposed regions of the photoreceptor) keeps decreasing as a result of increased dark decay as a function of cycles. This generally leads to reduced image densities in the copies of the documents. Thus, there is a need to measure all these photoreceptor characteristics with ease and over a wide range of timings, temperatures and ambient conditions.

Cycling scanners employing corotrons have been utilized for measuring photoreceptor characteristics. These scanners are designed to simulate the cycling of photoreceptors in a copier, duplicator and printer by subjecting a test sample of photoreceptor to timed charge, expose and discharge cycles. Scanners do not utilize all of the stations in a completely operational xerographic machine. Thus, for example, test scanners normally involve electrical charging, imagewise discharging and flood erase steps omitting the development, transfer and cleaning steps. In drum scanners the photoreceptor in the form of a cylindrical drum (or belt pieces mounted on a drum blank) is rotated on a shaft. The photoreceptor is charged by means of a corotron mounted along the circumference of the drum. The surface potential is measured as a function of time by several capacitively coupled probes placed at different locations around the drum. The probes are calibrated by applying a known potential to the drum substrate. The photoreceptor is exposed and erased by light sources located at appropriate positions around the drum. The measurement involve charging the photoreceptor in a constant current (a certain charge is placed on the photoreceptor) or a constant voltage mode. As the drum rotates the initial charging potential is measured by a first probe. Further rotation lead to an exposure station where the photoreceptor is exposed to a monochromatic or broad band light of known intensity. The surface potential after exposure is measured by a second and third probe. The photoreceptor is finally exposed to an erase lamp of appropriate intensity and any residual potential is measured by a fourth probe. The process is repeated with the magnitude of the exposure automatically changed for the next cycle. A photo induced discharge curve is obtained by plotting the potential at the second and third probes as a function of exposure. Further experimentation might involve changing the wavelength of the exposure and repeating the procedure or eliminating the exposure and measuring the dark decay. Cyclic stability of the photoreceptor can be measured by continuous cycling for 10,000 to 100,000 cycles.

Components of the drum scanner are mounted so that corotron, exposure lamp and probes can be moved along the circumference of the drum and clamped. The shortcomings of this type of system include, for example, the time under corotron (or the voltage source) is limited to the physical width of the corotron divided by the surface velocity of the drum which might range between 5 inches per sec to 60 inches per second. Also the voltage is measured at four (or any other number equal to the number of probes employed) discrete points in time determined by the angular location of the probe (with respect to the corotron) divided by the surface velocity. Further, it is cumbersome to move probes to change timing. In addition, data relating to potential between the charging station and the first probe is not available. Moreover, the physical size of drum scanners requires that the scanner equipment be placed in a large controlled atmosphere chamber which in turn requires a long time to change ambient (relative humidity and temperature) conditions. Further, drum scanners cannot be operated in non air (e.g. nitrogen or argon) environments to study the role of oxygen in photoreceptor operation or degradation. Also, corona charging is unstable in nitrogen or argon atmospheres. In drum scanners, the maximum potential is limited by what the charging device will allow.

INFORMATION DISCLOSURE STATEMENT

Z.D. Popovic, D. Parco and P. Iglesias, SPIE Vol. 1253 Hard Copy and Printing Materials, Media and Processes, 175 (1990)—A scanning stylus instrument is described for use in the investigation of the electrical properties of individual microscopic defects in organic photoreceptors. A schematic diagram of the measurement circuitry is shown in FIG. 1 on page 176.

M. Stolka, J.F. Yanus and D.M. Pai, J. Phys, Chem., 1984, 88, 4707–4717, Hole Transport in Solid Solutions of Diamine and Polycarbonate, is described. FIG. 1(*a*) is schematic of a layered structure shown comprising a semi-transparent gold layer, a molecular dispersion of a polycarbonate layer, and amorphous selenium layer, and an aluminum substrate. FIG. 1(*b*) the aluminum substrate layer is connected to grounded voltage source and the semi-transparent gold layer is connected to an oscilloscope and also ground to a resistor. Holes photogenerated in the selenium layer by a light flash are injected and displaced through a transport layer. The current due to the carrier transit is displayed on an oscilloscope on a double linear axis.

Zoran Popovic, Pablo Igesias, "Characterization of Microscopic Electrical Non-Uniformities in Xerographic Photoreceptors", Fifth International Congress on Advances and Non-Impact Printing Technologies, Nov. 12–17, 1989, San Diego, CA. An approach to study electrical nonuniformities in photoreceptors is disclosed in which a shielded stylus is used to scan photoreceptor while in intimate contact with the photoreceptor surface. The photoreceptor is carried on a computer controller X-Y stage. The ground plane of the photoreceptor is connected to the high voltage power supply through a resistor and high voltage relay. A polish steel stylus tip is brought into contact with the photoreceptor surface. The stylus tip is immersed in silicon oil to prevent electrical breakdown. The presence of silicon oil insulation is absolutely necessary for reproducible measurements. The stylus shield is ground in a sensing electrode connected to an electrometer to measure the charge flow as voltage is applied to the sample. The whole system is controlled by a Xerox 6065 personal computer.

Zoran Popovix, Dave Parco, Pablo Igesias, "Nature of Microscopic Electrical Detects in Organic Photoreceptors", Proceedings SPIE-SPSE Electronic Imaging Science and Technology Symposium, Feb 11–16, 1990, Santa Clara, CA. The device described in the paper entitled "Characterization of Microscopic Electrical Non-Uniformities in Xerographic Photoreceptors", above, is used to investigate the electrical properties of individual microscopic electrical defects in organic xerographic photoreceptors. The shape of individual microscopic electrical defects were mapped and their current voltage characteristics were measured.

R. Gerhard-Multhaupt and W. Perry, J. Phys. E; Sci. Instrum. 16, 421–422 (1983). A scanning capacitive probe is described for the measurement of surface-charge distributions on an electret foils. The probe is a mosfet electrometer follower together with a high resolution adapter.

E.J. Yarmchuck and G.E. Keefe, J. Appl. Phys. 66(11), 1 Dec. 1989. A technique is disclosed for direct, quantitative measurements of surface charge distributions on photoconductors. The photoconductors are carried on a stepping table from a corona charging station to an exposure station and then to the measurement station. Surface charge distribution is determined by a sequence of point-by-point charge measurements at different locations relative to the exposure. Charge measurements are made with an electrometer.

U.S. Pat. No. 3,898,001 to Hardenbrock et al, issued Aug. 5, 1975—An electrometer system is disclosed which measures electrostatic charges such as a charge level on a photoconductor surface. The electrometer measures a drop in surface voltage in an absence of light on a photoreceptor which is characterized as dark decay, e.g. see Column 1, lines 27-52. The electrometer can measure the remaining or background voltage on a photoreceptor remaining after exposure. The control of this background voltage is important for proper development and copy quality U.S. Pat. No. 4,134,137 to Jacobs et al, issued Jan. 9, 1979—A single wire microelectrometer imaging system is disclosed which includes a means to measure dark decay. A photoreceptor can be selected to minimize dark decay due to a scanning process requiring a finite length of time. A multiple probe electrometer array is provided which comprises a number of single probe electrometers which increase the electronics and gap maintenance complexity while reducing mechanics, image interlace complexities, and processing time.

U.S. Pat. No. 4,512,652 to Buck et al, issued Apr. 23, 1985—A controller is disclosed which regulates charging of a photoconductive member. The controller determines a charging current as a function of a rest time between successive copying cycles. The controller is adapted to adjust the charging current to compensate for dark decay.

U.S. Pat. No. 4,319,544 to Weber, issued Mar. 16, 1982, method and apparatus are disclosed which produce a dynamic bias value to control a toning process. The dynamic bias value appears as an electric potential on a bias electrode which is controlled to change with a natural change in a photoconductor charge with elapsing time. A natural decay curve may be synthesized digitally to produce a change in toning electrode bias.

Thus, there is a continuing need for a system for predicting photoreceptor life.

SUMMARY OF THE INVENTION

It is, therefore, an object of the present invention to provide an improved process and apparatus for the continuous monitoring of the potential on an electrophotographic imaging member which overcomes the above-noted deficiencies.

It is yet another object of the present invention to provide an improved process and apparatus for the continuous monitoring of the potential on an electrophotographic imaging member with no limit on the time scale utilized. It is still another object of the present invention to provide an improved process and apparatus for the continuous monitoring of the potential on an electrophotographic imaging member while the member is held charged for extended periods.

It is another object of the present invention to provide an improved process and apparatus for the continuous monitoring of the potential on an electrophotographic imaging member after charging at any suitable potential.

It is yet another object of the present invention to provide an improved process and apparatus to measure the charging characteristics of an electrophotographic imaging member.

It is yet another object of the present invention to provide an improved process and apparatus for the continuous monitoring of the potential on an electrophotographic imaging member in which the imaging member can be forced to accept any suitable potential placed by the voltage source.

It is yet another object of the present invention to provide an improved process and apparatus to continuously charge, discharge and erase an electrophotographic imaging member for large members of cycles to determine photoreceptor stability.

It is yet another object of the present invention to provide an improved process and apparatus to measure the discharge characteristics of an electrophotographic imaging member.

It is yet another object of the present invention to provide an improved process and apparatus to measure the spectral response characteristics of an electrophotographic imaging member.

It is yet another object of the present invention to provide an improved process and apparatus to measure the electrical characteristics of an electrophotographic imaging member in an atmosphere other than ambient.

The foregoing objects and others are accomplished in accordance with this invention by providing a process for ascertaining the electrical discharge properties of an electrophotographic imaging member comprising the steps of (a) providing at least one electrophotographic imaging member comprising an electrically conductive layer and at least one photoconductive layer, (b) contacting the surface of the electrophotographic imaging member with a substantially transparent electrode and applying an electric potential or applying an electric current to form an electric field across the photoconductive layer, (c) terminating the applying of the electric potential or the electric current, (d) exposing the photoconductive layer to activating radiation to discharge the electrophotographic imaging member, (e) repeating steps (b), (c) and (d), and (f) measuring the potential across the photoconductive layer during steps (b), (c) and (d) as a function of time by means of an electrostatic meter coupled to the electrode. Also, disclosed is apparatus for ascertaining electrical discharge properties of an electrophotographic imaging member including (a) means to support an electrophotographic imaging member comprising an electrically conductive layer and at least one photoconductive layer, (b) means for applying an electric potential to a substantially transparent electrode on the electrophotographic imaging member to form an electric field across the photoconductive layer, (c) means for terminating the applying of the electric potential, (d) an electrostatic voltmeter probe coupled to the means for applying an electric current to the electrode, (e) means for exposing the photoconductive layer through the substantially transparent electrode to activating radiation to discharge the electrophotographic imaging member to a predetermined level, and (f) means for exposing the photoconductive layer to activating radiation to fully discharge the electrophotographic imaging member.

BRIEF DESCRIPTION OF THE DRAWINGS

A more complete understanding of the present invention can be obtained by reference to the accompanying drawings wherein.

These figures merely schematically illustrate the invention and are not intended to indicate relative size and dimensions of the device or,components thereof. In the drawings, like reference numerals have frequently been used to identify elements.

DETAILED DESCRIPTION OF THE DRAWINGS

Figure 1:
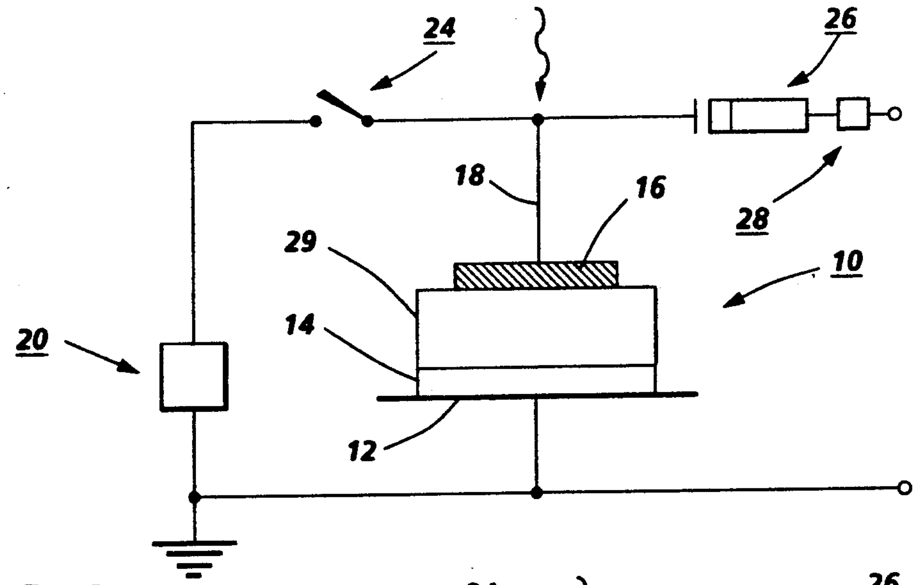
FIG. 1 is a schematic illustration of an electrical circuit employed in one embodiment of the system of this invention.

Referring to FIG. 1, a schematic, including an electrical circuit, employed in the system of this inventionn, is shown in which a photoreceptor 10 rests on a substantially transparent, electrically conductive support member 12. The electrically conductive surface of substrate level 14 of photoreceptor 10 is electrically grounded through electrically conductive support member 12. Photoreceptor 10 carries a thin, substantially transparent vacuum deposited metal electrode 16 on its upper surface. An electrical connector 18 connects electrode 16 with a high voltage power supply 20 when a controller such as a relay 24 is closed. Relay 24 is capable of being closed and then opened after a predetermined time. A probe 26 from an electrostatic meter 28 (an elecrometer) senses, via electrical connector 18, the voltage imposed across photoconductively active layer 2 during testing of photoreceptors. Photoconductively active layer 2 may comprise a single layer such as photoconductive particles dispersed in a binder or multiple layers such as a photoconductive charge generating layer and a charge transport layer. The output of electrostatic meter 28 is fed to a chart recorder (not shown) or to a suitable computer (not shown). Exposure light (represented by a downwardly pointed wavy arrow) is periodically transmitted through electrode 16 to photoreceptor 10. The exposure light is from a source capable of being turned on and off (e.g. flashed) at predetermined times. Similarly an erase light can periodically be transmitted to photoreceptor 10 through transparent support member 12 and substrate layer 14.

Figure 2:
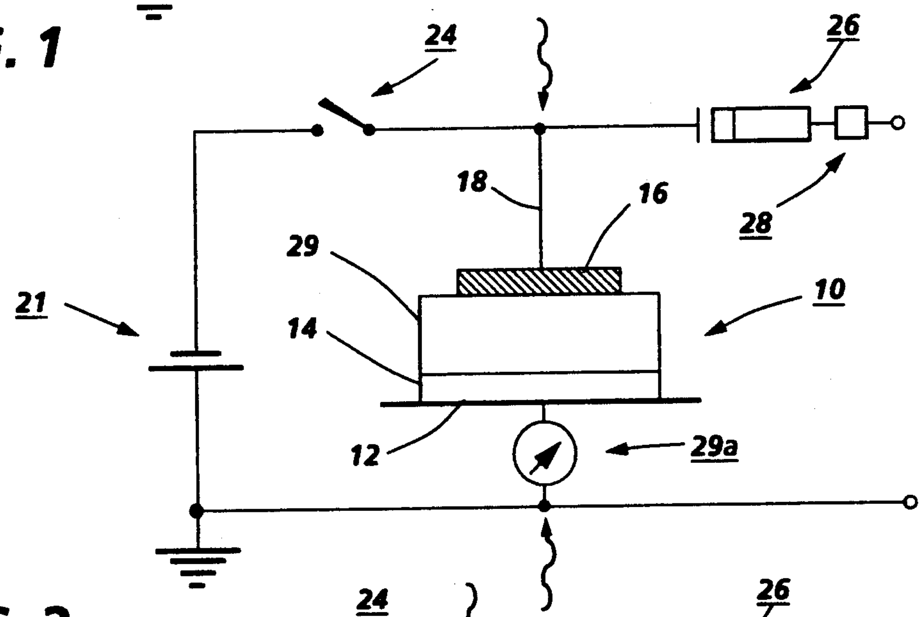
FIG. 2 is a schematic illustration of an electrical circuit employed in another embodiment of the system of this invention.

In FIG. 2, a schematic, including an electrical circuit, employed in the system of this invention, is shown in which a photoreceptor 10 rests on a substantially transparent, electrically conductive support member 12. The electrically conductive surface of substrate layer 14 of photoreceptor 10 is electrically grounded through electrically conductive support member 12 and through coulomb meter 29*a*. Photoreceptor 10 carries a thin, substantially transparent vacuum deposited metal electrode 16 on its upper surface. An electrical connector 18 connects electrode 16 with a direct current voltage power supply 21 when a controller such as a relay 24 is closed. Relay 24 is capable of being closed and then opened after a predetermined time. A probe 26 from an electrostatic meter 28 (an electrometer) senses, via electrical connector 18, the voltage imposed across photoconductively active layer 29 during testing of photoreceptors. The output of electrostatic meter 28 is fed to a chart recorder (not shown) or to a suitable computer (not shown). Exposure light is periodically transmitted through electrode 16 to photoreceptor 10. The exposure light is from a source capable of being turned on and off (e.g. flashed) at predetermined times. Similarly an erase light (represented by an upwardly pointing wavy arrow) can periodically be transmitted to photoreceptor 10 through transparent support member 12 and substrate layer 14.

Figure 3:
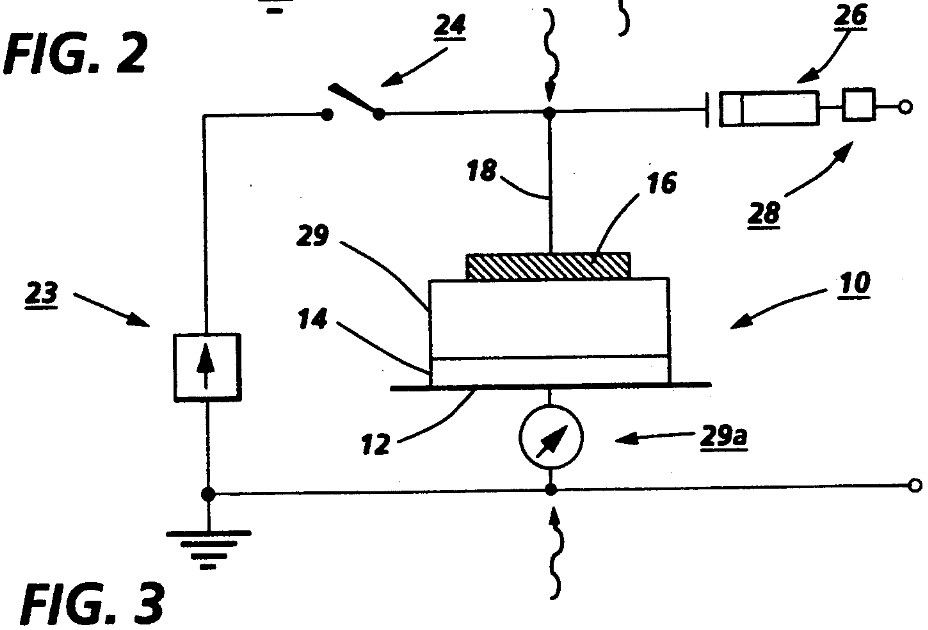
FIG. 3 is a schematic illustration of an electrical circuit employed in still another embodiment of the system of this invention.

Illustrated in FIG. 3, is schematic, including an electrical circuit, employed in the system of this invention, in which a photoreceptor 10 rests on a substantially transparent, electrically conductive support member 12. The electrically conductive surface of substrate layer 14 of photoreceptor 10 is electrically grounded through electrically conductive support member 12 and through coulomb meter 29*a*. Photoreceptor 10 carries a thin, substantially transparent vacuum deposited metal electrode 16 on its upper surface. An electrical connector 18 connects electrode 16 with a current source 23 when a controller such as a relay 24 is closed. Relay 24 is capable of being closed and then opened after a predetermined time. A probe 26 from an electrostatic meter 28 (an electrometer) senses, via electrical connector 18, the voltage imposed across photoconductively active layer 29 during testing of photoreceptors. The output of electrostatic meter 28 is fed to a chart recorder (not shown) or to a suitable computer (not shown). Exposure light is periodically transmitted through electrode 16 to a photoreceptor 10. The exposure light is from a source capable of being turned on and off (e.g. flashed) at predetermined times. Similarly an erase light (represented by an upwardly pointing wavy arrow) can periodically be transmitted to photoreceptor 10 through transparent support member 12.

Figure 4:
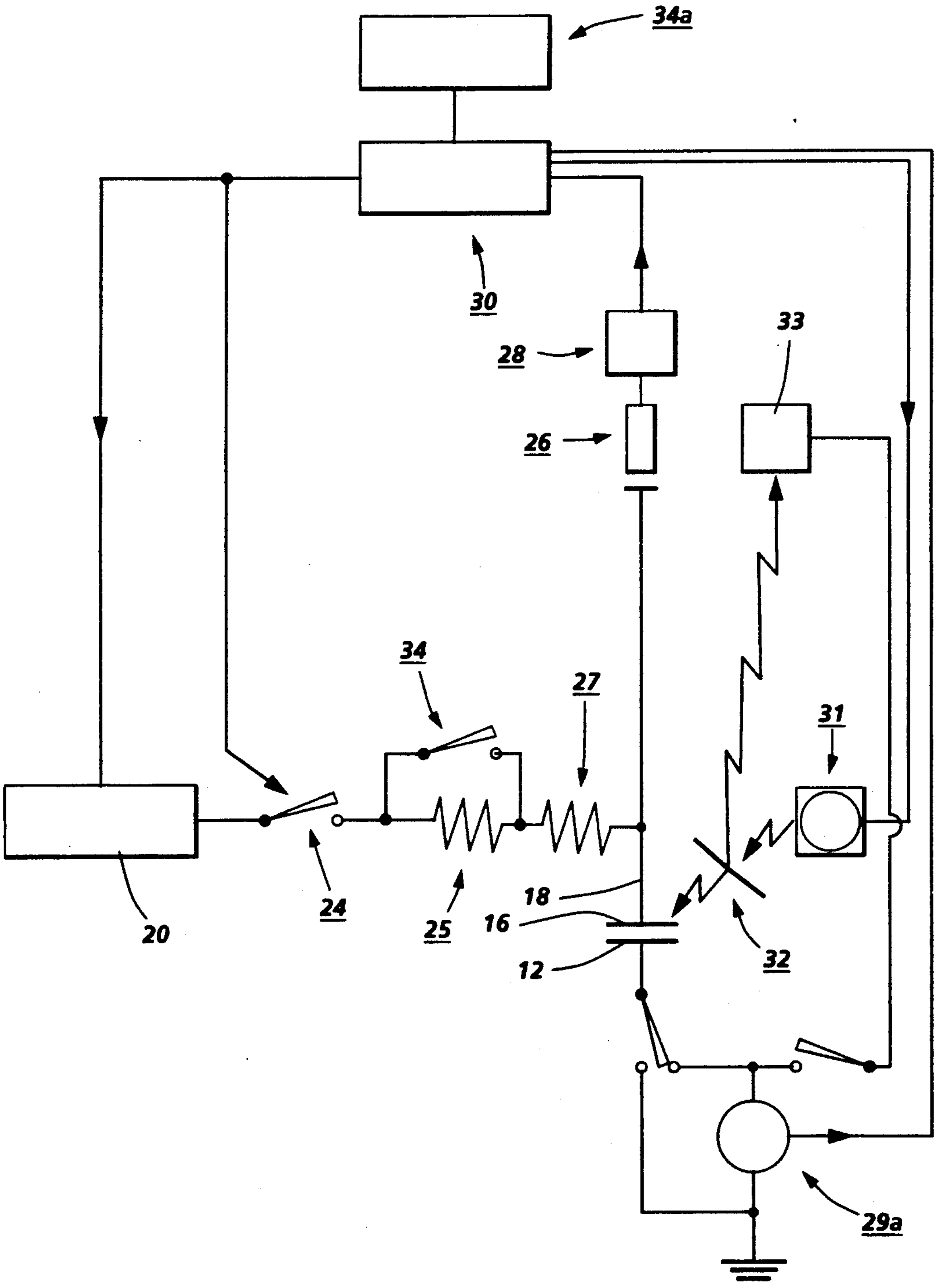
FIG. 4 is a schematic illustration of an overall electrical circuit employed in the system of this invention.

Shown in FIG. 4 is a schematic, including an electrical circuit, employed in a system of this invention, in which a photoreceptor sample (not shown) rests on a substantially transparent, electrically conductive support member 12. The electrically conductive surface of substrate layer 14 of the photoreceptor sample is electrically grounded through electrically conductive support member 12 and through coulomb meter 29*a*. The photoreceptor sample carries on its outer imaging surface a thin, substantially transparent vacuum deposited metal electrode 16. An electrical connector 18 connects electrode 16 with a high voltage supply 20 through resistor 25 (e.g. 500 Meg ohms) and resistor 27 (e.g. 10 Meg ohms) when a controller such as a relay 24 is closed. Relay 24 is capable of being closed and then opened after a predetermined time. A probe 26 from an electrostatic meter 28 (an electrometer) senses, via electrical connector 18, the voltage imposed across the photoconductively active layer of the photoreceptor sample (not shown) during testing of photoreceptors. The output of electrostatic meter 28 is fed to a suitable computer 30. Computer 30 is equipped with a data acquisition board which provides digital input/output functions, analog to digital, and digital to analog conversion functions. Digital outputs from computer 30 control relay 24, reset functions of coulomb meter 29*a* and the firing of an exposure light source 31 and an erase light source [(which can be light source 31 serving the dual function of an exposure light and an erase light trigged at different times or a separate erase light (not shown for the sake of clarity) for transmitting light to the photoreceptor sample through transparent support member 12]. The exposure light is transmitted through electrode 16 to photoreceptor 10. For tests which require on-line monitoring of exposure light intensity a beam splitter 32 deflects a portion of the illumination light to a photodiode 33. Coulomb meter 29*a* is used in two ways, either to measure charge flow through the photoreceptor sample or to monitor the illumination light energy by measuring the charge flow through photodiode 33. Most instruments such as electrostatic meter 28, coulomb meter 29*a*, exposure light source 31 and high voltage supply 20 are connected directly to the data acquisition board of computer 30, but others such as relay 24 utilize simple interface circuitry. The system illustrated in FIG. 4 can operate in two charging modes, constant voltage and constant current. In the constant voltage mode resistor 25 is shorted by closing relay 34 and the desired voltage applied to the photoreceptor sample by closing voltage relay 24. In the constant current mode a constant voltage difference is maintained across resistor 25 resulting in a constant charging current delivered to the photoreceptor sample. This may be accomplished by continuously measuring the photoreceptor sample potential and adjusting high voltage supply 20 to maintain constant current charging. At the end of the charging time interval the relay 24 is opened and the potential of the photoreceptor sample is monitored to determine the dark decay. Subsequently, the photoreceptor sample is illuminated with an expose pulse from exposure light source 31 and thereafter with an erase pulse from an erase light source (not shown). Computer 30 can be programmed to perform numerous measurements including the following:

(1) XEROGRAPHIC CYCLING MEASUREMENTS

Cyclic stability measurements as constant voltage may be carried out as follows: The photoreceptor sample is mounted in an enclosed chamber and connected to the circuit described in FIG. 4. The 500 megohm resistor 25 is shorted by closing relay 34 and a menu dealing with the cyclic measurements is called up on computer 30 using any suitable program which preferably utilizes a menu. The menu can be used to set the timing sequences for the charging duration (relay 24 closure time), the time between opening of relay 24 and the onset of the exposure flash (exposure light source 31), the time duration between the exposure flash and the erase flash (erase light source not shown) and the time duration between the erase flash and the closure of relay 24 for the next cycle. These timings are set for predetermined values. The menu simplifies the setting of the voltage value at which the experiment is to be carried out. In other words, it is set for the predetermined volts desired. Additionally, the menu simplifies the setting of the number of cycles. Thus, it can be used to set the predetermined number of desired cycles. The front exposure flash intensity (exposure light source 31) is adjusted to provide appropriate light through the electrode 16 (e.g. a thin semitransparent gold film). The rear erase flash intensity is adjusted to an appropriate predetermined value. Data generated during cycling is plotted with a graphics printer 34*a*. The dark decay reading is the potential difference between the applied voltage and the voltage remaining just prior to the onset of the exposure source. A change (increase or decrease) in this dark decay with cycles is measured and plotted. Instead of a menu driven computer, any other suitable and conventional means such as a programmable controller may be utilized.

(2) Q-V MEASUREMENTS (applying a known charge and measuring the potential)

Charge - voltage (QV) measurements may be performed as follows: The photoreceptor sample is connected to the circuit described in FIG. 4. The short across the 500 megohm resistor 25 is removed by opening relay 34 and a menu dealing with the QV measurements is called up on computer 30. A menu is used to set the timing sequences for the charging duration (relay 24 closure time), the time between opening of the relay 24 and the onset of the exposure flash (exposure light source 31), the time duration between the exposure flash and the erase flash and the time duration between the erase flash and the closure of the relay 24 for the next cycle. These timings are set to appropriate predetermined values. The menu also facilitates the setting of the starting charge, charge steps and the final charge all in nanocoulombs, all of which are also set to appropriate predetermined values. The menu also simplifies the setting of the number of cycles at each coulomb setting. This is set to the appropriate predetermined value. The front exposure flash intensity is adjusted to provide appropriate light intensity through the gold electrode 16. The rear erase flash intensity is adjusted to an appropriate predetermined value. Data generated during cycling is plotted with a graphics printer 34.

(3) V-Q MEASUREMENTS (applying a known potential and measuring the flowing charge)

Voltage - charge (VQ) measurements may be carried out as follows: A photoreceptor sample is connected to the circuit shown in FIG. 4. The 500 megohms resistor 25 is shorted by closing relay 34 and a menu dealing with the dark decay measurements is called up on computer 30. A menu is used to set the timing sequences for the charging duration (relay 24 closure time), the time between opening of relay 24 and the onset of the exposure flash (exposure light source 31), the time duration between the exposure flash and the erase flash and the time duration between the erase flash and the closure of relay 24 for the next cycle. These timings are set to appropriate predetermined values. The menu also allows the setting of the starting voltage steps and the final voltage. These are also set to the appropriate values. The menu also allows the setting of the number of cycles at each voltage setting. This is also set to an appropriate predetermined value. The front exposure flash intensity is adjusted to an appropriate predetermined value. The rear erase flash intensity is adjusted to an appropriate predetermined value. The charge flowing through the device during the time interval when relay 24 is closed is measured and plotted with a graphics printer 35.

(4) DISCHARGE VERSUS EXPOSURE CURVES, XEROGRAPHIC GAIN (quantum efficiency) AND SPECTRAL RESPONSE CURVES Photo Induced Discharge (PIDC) measurements may be carried out as follows: The photoreceptor sample is connected to the circuit described in FIG. 4. The 500 megohms resistor 24 is shorted by closing relay 34 and a menu dealing with the PIDC measurements is called up on computer 30. The menu is used to set the timing sequences for the charging duration (relay 24 closure time), the time between opening of the relay 24 and the onset of the exposure flash (exposure light source 31), the time duration between the exposure flash and the erase flash and the time duration between the erase flash and the closure of relay 24 for the next cycle. These timings are set to appropriate predetermined values. The menu also facilitates the setting of the voltage at which the experiment is to be carried out. This is also set to the appropriate predetermined values. The front exposure flash intensity is adjusted to the appropriate predetermined value and is to be increased in steps. The rear erase flash intensity is adjusted to an appropriate predetermined value. The discharge voltage (difference in the potential just prior and just after the exposure step) is plotted with a graphics printer 34 as a function of light intensity., (5) DARK DECAY VERSUS APPLIED VOLTAGE CURVES (the difference between the applied potential when the relay is closed and the remaining potential a certain time after the relay opens)

Dark decay measurements may be carried out as follows: The photoreceptor sample is mounted and connected to the circuit described in FIG. 4. The 500 megohm resistor 25 is shorted by closing relay 34 and a menu dealing with the dark decay measurements is called up on computer 30. The menu is used to set the timing sequences for the charging duration (relay closure time), the time between opening of the relay and the onset of the exposure flash, the time duration between the exposure flash and the erase flash and the time duration between the erase flash and the closure of the relay for the next cycle. These timings are set to appropriate predetermined values. The menu also allows the setting of the starting voltage steps and the final voltage. These are also set to an appropriate predetermined values. The menu also allows the setting of the number of cycles at each voltage setting. This is also set to an appropriate predetermined value. The front exposure flash intensity is adjusted to an appropriate predetermined value. The rear erase flash intensity is adjusted to an appropriate predetermined value. The dark decay which is the potential difference between the applied potential and the potential remaining on the device just prior to the onset of the exposure flash is plotted with a graphics printer 34.

Figure 5:
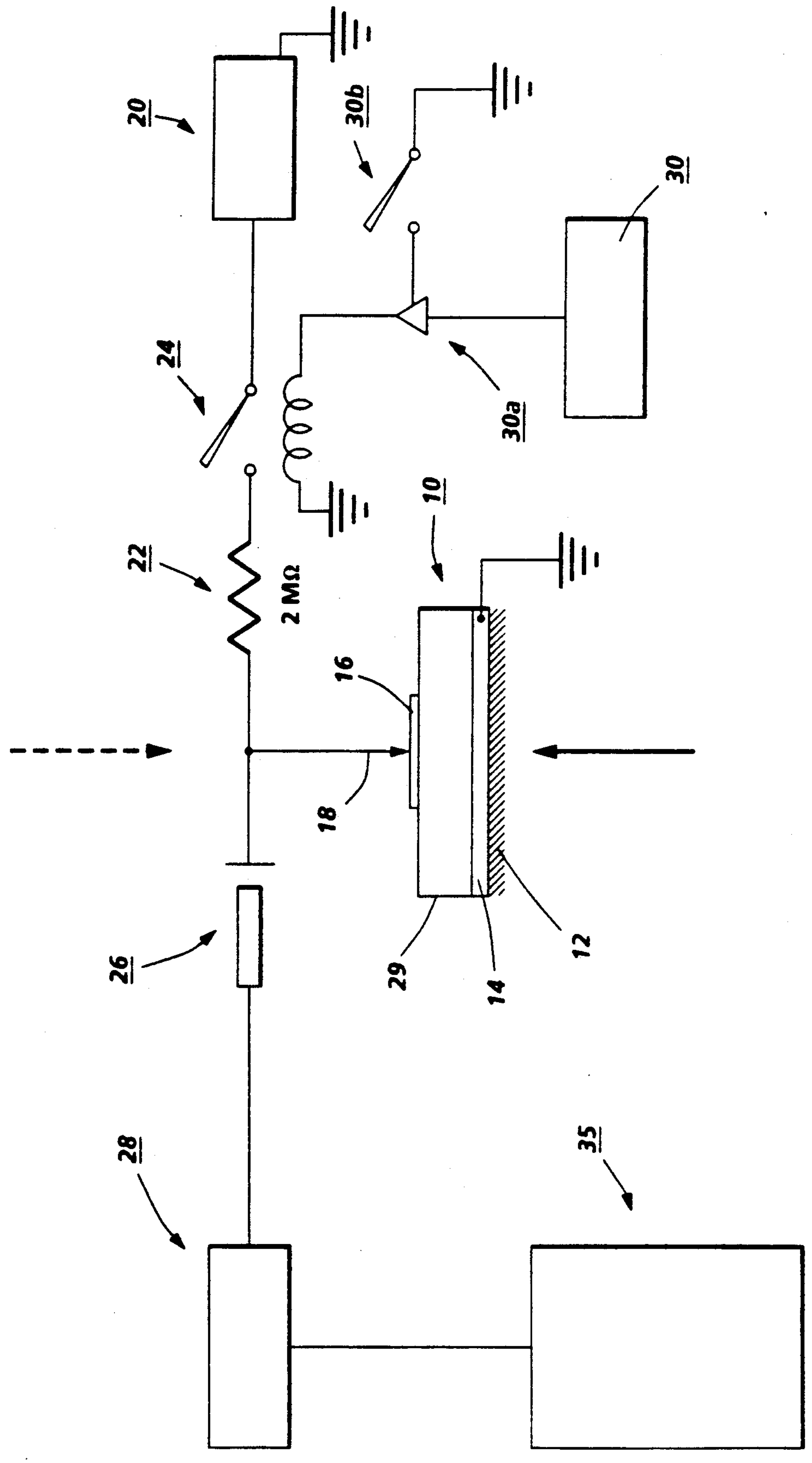
FIG. 5 is a schematic illustration of an electrical circuit employed in another embodiment of the system of this invention.

Referring to FIG. 5, another schematic, including an electrical circuit, is shown in which a photoreceptor 10 rests on a substantially transparent support member 12. This circuit is described in greater detail in a copending application entitled "Photoreceptor Assessment System" filed on the same day as the instant application in the names of A. Mishra and E. Domm (also identified as Attorney Docket Number D/90391Q), the entire disclosure therof being incorporated herein by reference. The electrically conductive surface of substrate layer 14 of photoreceptor 10 is electrically grounded. Photoreceptor 10 carries a thin, substantially transparent vacuum deposited metal electrode 16 on its upper surface. An electrical connector 18 connects electrode 16 with a high voltage power supply 20 through resistor 22 when a controller such as a relay 24 is closed. Relay 24 is activated by a signal from computer 30 which is fed through a FET **30*a*. The gate of the FET 30*a* is closed by the magnetically activated reed switch 30*b*. The magnetic switch is closed when the lid (not shown) of the apparatus is closed. A probe 26 (e.g. Model 17211, available from Trek) from a conventional electrometer 28 (e.g. Model 3666, available from Trek) senses, via electrical connector 18, the voltage imposed across photoconductively active layer 29 during testing of photoreceptors. Photoconductively active layer 29 may comprise a single layer such as photoconductive particles dispersed in a binder or multiple layers such as a photoconductive charge generating layer and a charge transport layer. The output of electrometer 28 is fed to chart recorder or graphics printer 35 (e.g. Model TA2000, available from Gould or to a suitable computer (not shown, e.g. IBM compatible computer). Exposure light (represented by dashed arrow) is periodically transmitted through substantially transparent electrode 16 to a photoreceptor 10 and, similarly, erase light (represented by solid arrow) is periodically transmitted to photoreceptor 10 through transparent support member 12**.

Figure 6:
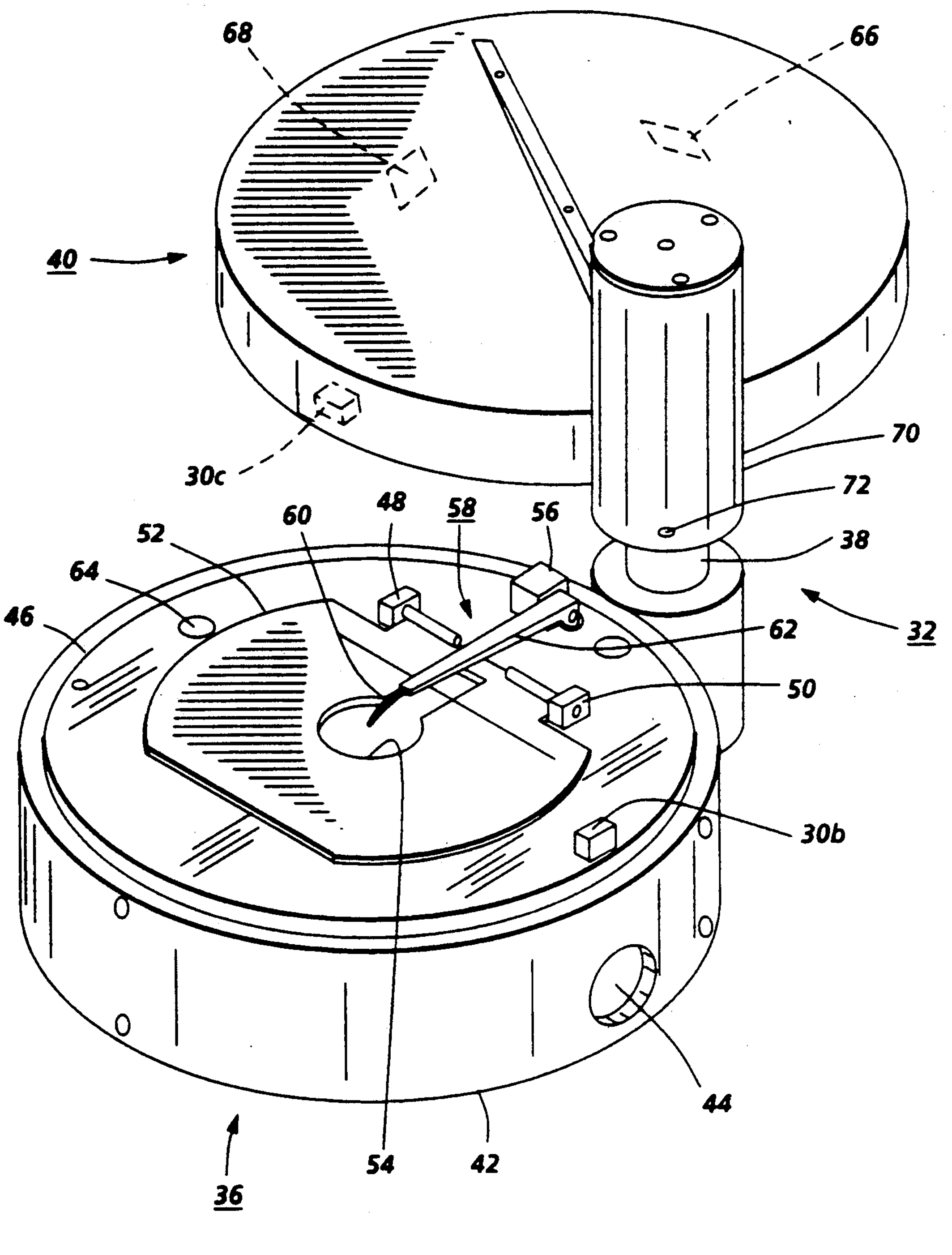
FIG. 6 is an isometric illustration of an apparatus employed in the system of this invention.

In FIG. 6, a dark decay detecting apparatus 32 is illustrated comprising a base assembly 36 which supports a vertical post 38 which in turn supports a cylindrical lid assembly 40. Base assembly 36 comprises a light tight cylindrical housing 42 having a opening 44 on one side to allow entry of power cords leading to an erase light source (not shown) located within housing 42 or to admit erase light from a suitable external source (not shown) and another opening on the other side (not shown) to allow entry of power cords leading to a light source (not shown) located within housing 42 or to admit exposure light from a suitable external source (not shown). Any suitable erase light source may be utilized. Typical erase light sources include broadband flash tubes such as xenon lamps. Although optional, it is preferred to tune the light source to the spectral response of the photoreceptor by suitably filters. As indicated above, the light from either the erase light exposure source or the exposure light source may be supplied by a source located within base assembly 36 or fed into base assembly 36 from an external source by any suitable means. Typical light feeding means include, for example, light pipes and the like. Secured to the flat glass upper platen 46 of cylindrical housing 42 are a pair of hinge post 48 which receive hinge pins 50 of pivotable flat ground plate 52. Flat glass upper platen 46 is transparent and electrically insulating. When a sample a photoreceptor 10 (see FIG. 5) is mounted for testing under ground plate 52, aperture 54 encircles but does not touch the circular vacuum deposited metal electrode 16 (see FIG. 5). Ground plate 52 is electrically grounded and contacts the upper surface of the photoreceptor sample to flatten the sample and to electrically ground the electrically conductive surface of substrate layer 14 of photoreceptor 10. Grounding of the conductive surface of layer 14 of photoreceptor 10 occurs because, mounting under ground plate 52, a strip of the photoconductively active layer 29 along one edge of photoreceptor 10 is scraped away to expose a portion of the electrically conductive surface of substrate layer 14. A thick conductive silver coating (not shown) is applied to the exposed strip of conductive surface. Since the upper surface of the deposited silver coating extends beyond the upper surface of photoconductively active layer 29, ground plate 52 contacts the silver coating when it rests on the upper surface of photoreceptor 10 thereby grounding the electrically conductive surface of substrate layer 14. Secured to the flat upper surface 46 of cylindrical housing 42 is hinge post 56 which supports pivotable electrical connector arm 58. Pivotable electrical connector arm 58 has an electrically conductive finger 60 which can be swung into and out of contact with the circular vacuum deposited metal electrode 16 (see FIG. 5) when a sample of photoreceptor 10 (see FIG. 5) is mounted for testing under ground plate 52. Ground plate 52 is connected to ground. When the free end of ground plate 52 is lifted to mount the sample, ground plate 52, connected to hinge pins 50, contacts and lifts the high voltage arm 62 and thus electrically grounds it. Thus, if other safety switches fail, the power supply will be short circuited and the relay in the power supply will switch it off. Lid assembly 40 swivels around and slides vertically on vertical post 38 and is adopted to fit as a light tight lid on top of base assembly 36. A hole 64 is positioned in flat glass upper platen 46 adjacent to the exposure light opening (not shown) on the side of base assembly 36 diametrically opposite from opening 44. Mounted on the roof of the hollow interior of lid assembly 40 are two exposure light mirrors 66 and 68. When cylindrical lid assembly 40 is aligned with and resting on base assembly 36, exposure light mirror 66 is positioned to horizontally reflect exposure light (projected upwardly from hole 64) to mirror 68 which in turn reflects the exposure light downwardly through the circular vacuum deposited metal electrode 16 (see FIG. 1) on photoreceptor samples. A magnetically activated reed switch **30*b* comprising mounted on the edge of flat glass upper platen 46 and permanent magnet 30*c* attached to the inside surface of lid assembly 40. Permanent magnet 30*c* is positioned to ensure that when lid assembly 40 is closed, magnet 30*c* rests over and activates reed switch 30*b* to close it. Closure of reed switch 25 causes, with the aid of suitable means such as a VFet transistor 30*a* shown in FIG. 1, high voltage relay 24 (see FIG. 5) to be ready to receive a trigger pulse from the computer 30. When lid assembly 40 is opened, magnet 30*c* is moved away from reed switch 30*b*, thereby opening reed switch 30*b* and turning off the VFet transistor 30*a* and high voltage relay 24, thus preventing accidental shock when an operator removes or inserts samples. Cylindrical lid assembly 40 is supported on vertical post 38 by a journal box 70. A guide pin 72 is press fitted into a hole in the side journal box 70. The pin projects beyond the inner surface of journal box 70 into a slot (not shown) machined into the periphery of vertical post 38. The slot is similar in shape to an inverted "L" so that when cylindrical lid assembly 40 is aligned directly over base assembly 36, pin 72 rides in the vertical portion of the inverted "L" shaped slot so that lid assembly 40 may be moved vertically toward and away from base assembly 36. When cylindrical lid assembly 40 is lifted upwardly from a "closed" or "test" position until pin 72 has shifted to the upper limit of the slot, lid assembly 40 can be swung horizontally with pin 72 riding in the horizontal portion of the inverted "L" shaped slot until lid assembly 40 reaches an "open", "load" or "unload" position relative to base assembly 36 similar to the position illustrated in FIG. 6**.

In operation, with cylindrical lid assembly 40 in the "open" position, the free end of pivotable electrical connector arm 58 is pushed away from flat glass upper platen 46 by the plate 52 when it is lifted to mount the sample. In this position, the electric conducting finger 60 is grounded through plate 52. Because of the high voltages involved, the electrically conductive finger 60 and pivotable flat ground plate 52 should be electrically grounded during insertion and removal of a photoreceptor sample in the testing apparatus. Thus, when the pivotable flat ground plate 52 for flattening photoreceptor samples is raised to either insert or remove a photoreceptor sample, such raising automatically grounds the high voltage probe 60. This is a back-up safety feature because the arm 60 is also disconnected by safety switch 25 as the lid is lifted up. A sample of flexible photoreceptor is placed on flat glass upper platen 46. The sample is slightly smaller than the pivotable flat ground plate 52. The sample has previously been prepared (see above and hereinafter) for testing and carries a raised strip of thick conductive silver coating (not shown) along one edge of photoreceptor 10 to establish electrical contact with the conductive surface of substrate layer 14. Since the upper surface of the thick silver coating extends beyond the upper surface of photoconductively active layer 29, it contacts the lower surface of ground plate 52 to electrically ground the electrically conductive surface of substrate layer 14 of photoreceptor 10 when plate 52 is lowered to flatten photoreceptor 10. Photoreceptor 10 also carries a thin, substantially transparent (i.e. semitransparent) circular vacuum deposited metal electrode 16 of a suitable metal such as gold (see FIG. 5) on its upper surface that is encircled by, but not in physical contact with, aperture 54. The free end of pivotable electrical connector arm 58 is pivoted downwardly toward and into contact with metal electrode 16. Cylindrical lid assembly 40 is pivoted and lowered to produce a light tight fit between lid assembly 40 and base assembly 36. The assembly 40 closes the switch 25 and activates VFet transistor 30*a*. The computer pulse then can close the relay 24 for a desired, preselected time interval. A voltage pulse is applied by the activation of relay 24 for the preselected time interval, typically 100 milliseconds, and the dark decay of photoreceptor 10 is measured with probe 26 (see FIG. 5) and electrometer 28 (see FIG. 5) during the dark cycle following the voltage pulse but prior to light being emitted by the erase light. The voltage pulse may be at a fixed level, typically between levels to give a field of between about 45 volts/micrometer and about 80 volts/micrometer-from one cycle to another or may be gradually increased to vary the field, typically from 5 volts/micrometer to 80 volts/micrometer, during the assessment period. The dark decay measurement is taken at a fixed time period after termination of the voltage pulse, typically 1-2 seconds, and the measurement is recorded on chart recorder 35. If desired, any suitable computer (not shown) may be utilized instead of a chart recorder to monitor voltage during cycling. Photoreceptor 10 is then optionally exposed to the exposure light projected upwardly from hole 64 to mirror 66, then to mirror 68, and finally downwardly through the circular vacuum deposited metal electrode 16 (see FIG. 5) on the photoreceptor sample. To maximize light exposure through the electrode 16, the size of pivotable electrical connector arm 58 and electrically conductive finger 60 should be relatively small so that light exposure through electrode 16 is maximized. The entire sample is thereafter flood exposed by an erase light source (not shown) located within housing 42 or transmitted through opening 44 from a suitable source (not shown), through flat glass upper platen 46, through transparent support member 12, and through the electrically conductive surface of substrate layer 14. It is important that during the cycling, the erase light has sufficient intensity stability so that variable readings and other errors are avoided during measurements of photoreceptors from one batch to another. Since the erase light intensity should remain constant in order to give predictable readings, a suitable sensor (not shown) such as a photodiode may be utilized to detect changes in the light intensity so that the light may be either replaced or adjusted to ensure constant light intensity during the erase cycle. If desired, suitable filters (not shown) may be interposed between the erase light and photoreceptor to more accurately simulate the light frequency used in the copier, duplicator or printer in which the photoreceptor will ultimately be employed. Also, a conventional corotron or scorotron may be substituted for the electroded arrangement described above to apply an electrical charge to the photoreceptor sample. This is conveniently accomplished on a drum or flat plate scanner.

In one dark decay process described in greater detail in a copending application entitled "Photoreceptor Assessment System" filed on the same day as the instant application in the names of S. Mishra and E. Domm, a typical photoreceptor tested comprises a flexible supporting substrate layer, an electrically conductive layer, an optional blocking layer, an optional adhesive layer, a charge transport layer and a charge generating layer. Rather than requiring large amounts of test material, the test sample may be quite small in size, e.g., 2 inches by 4 inches. It has been found that a test of one small sample is an effective test for an entire roll or batch of rolls prepared from the same coating batch. The photoreceptor is solvent treated along one edge to dissolve and remove parts of the charge transfer layer, charge generating layer and adhesive layer to expose part of the electrically conductive layer. A electrically conductive layer of silver paint is applied to the exposed surface of the electrically conductive layer for purpose of forming a terminal contact point for application of an electrical bias to the conductive layer.

A predetermined area of the imaging surface of the photoreceptor not treated with solvent is coated with a thin vacuum deposited gold or other suitable metal layer through a mask or stencil having an appropriate size and shaped opening to form another electrode so that an electrical bias can be applied across the photoconductive layers of the photoreceptor from the gold electrode to the electrically conductive layer. The thickness of the metal electrode from one photoreceptor sample to another should be the same to ensure that the amount of light transmission is also the same as that used for the obtaining the comparison data to establish a standard. The metal electrode may be of any suitable size and shape, but the size and shape should be the same from one photoreceptor sample to another to ensure accurate comparisons.

Figure 7:
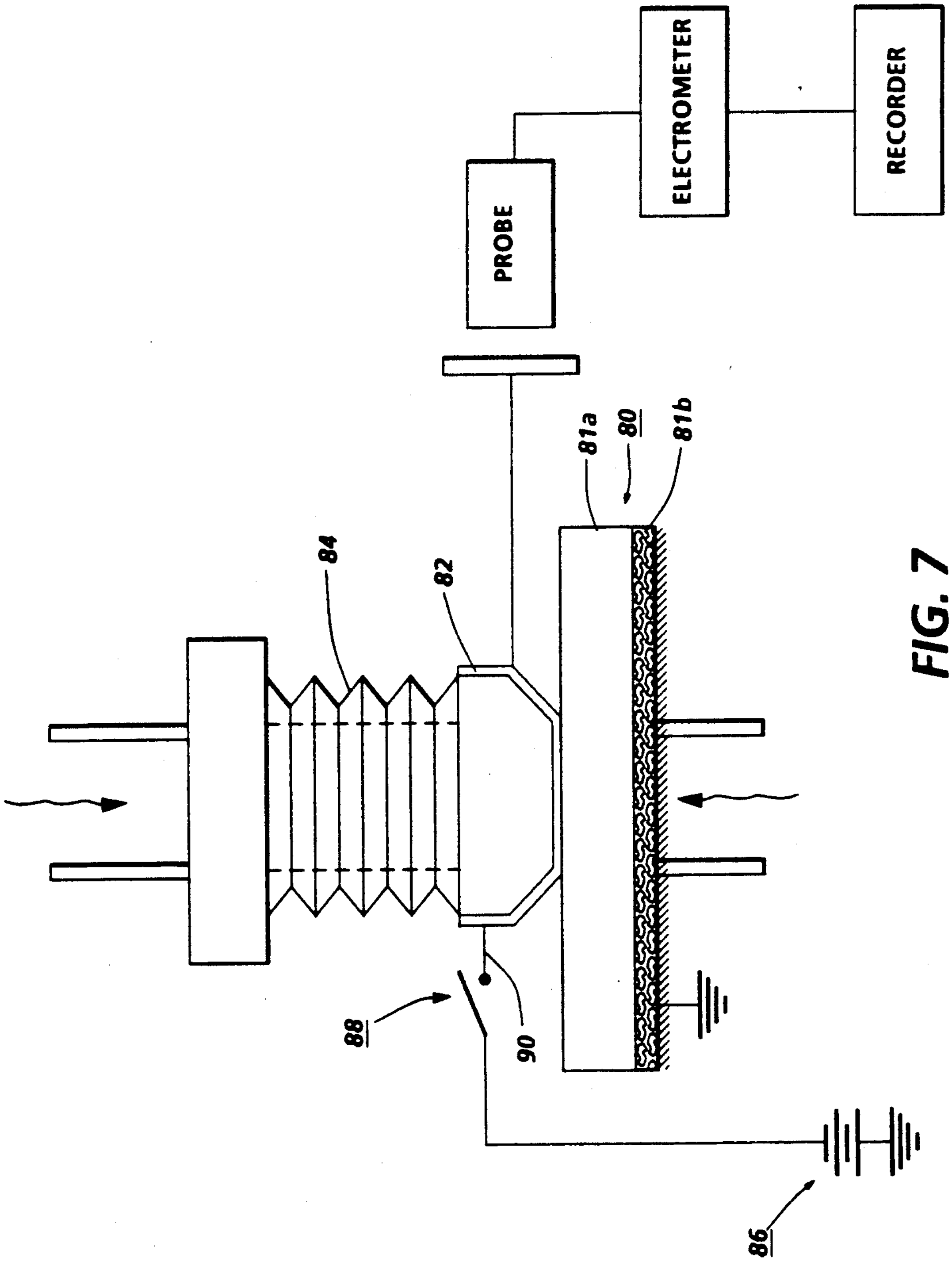
FIG. 7 is a schematic illustration of another embodiment of an electrical circuit employed in the system of this invention.

An alternative to the electroded technique for charging photoreceptor described above is through pressure contact. The schematic arrangement of the apparatus is shown in FIG. 7. Electrical contact is made on the top of a photoreceptor sample 80, comprising a charge transporting layer 81*a* and a charge generating layer 81*b*, through a transparent Nesa glass cone 82 which is supported by resilient metallic bellows 84. The electrically conductive outer surface of Nesa glass cone 82 is pressed against the upper surface of photoreceptor sample 80 to ensure good electrical contact. The transparent Nesa glass cone 82 is electrically connected to a power supply 86 through a relay 88 and a wire 90 soldered to the electrically conductive outer surface of Nesa glass cone 82. The arrangement for the rest of the apparatus is essentially identical to that shown in FIG. 5.

For accurate comparisons against a standard, the light exposure and the erase intensities must remain constant. This can be achieved by monitoring the light intensity with a photodiode mounted in the test device housing. The stray light from the sample during the exposure and erase pulses can be measured for light intensity provided the geometrical arrangement is not changed during cycling. This can be achieved by fastening the photodiode to the lid at a suitable location (not shown in the figures). If the light intensity of the light source, for example, a strobotac (available from Gen Rad Inc, Mass. USA) is found to have changed it can be tuned back to the original intensity by inserting appropriate neutral density filters between the light source and the photoreceptor sample. The actinic exposure intensity to be employed depends on the thickness of the transparent metal electrode. Thus, the thickness of the transparent metal electrode is monitored while the metal, e.g. gold, is evaporated onto the photoreceptor surface to form the contact electrode. Further, the light intensity can be indirectly monitored through the electrical characteristics of photoreceptor samples such as the background potential of two or more control samples that were previously tested and archived. The light intensity to be used for both exposure and erase depends on the speed and frequency sensitivities of the photoreceptor sample being tested. Typical light intensities are between about 3 ergs/cm$^2$ and about 20 ergs/cm$^2$ for the exposure step and between about 100 ergs/cm$^2$ and about 1500 ergs/cm$^2$ for the erase step. A typical light frequency range is between about 400 nm to 1000 nm for the spectral sensitivity range of the photoreceptors to be tested. The test system can also be utilized to predict how a photoreceptor will behave if various conditions during manufacturing are deliberately changed. Thus, for example, it can be utilized to predict the kind of performance a photoreceptor is likely to provide if the formulations of any of the photoreceptor layers is changed or the thickness of any of the layers are varied or if some of the fabrication conditions such as humidity, coating technique and the like are deliberately altered. Generally, armed with the fact that the tested sample exhibits unsatisfactory photoreceptor performance, one may thereafter review manufacturing records to determine whether any unusual events occurred which might affect the ultimate performance of the photoreceptor. For example, a difference in the manner in which one of the photoconductor layer coating composition was prepared or applied may be responsible for the unsatisfactory photoreceptor performance and this problem can promptly be rectified.

Electrostatographic flexible belt imaging members (photoreceptors) are well known in the art. The electrostatographic flexible belt imaging member may be prepared by various suitable techniques. Typically, a transparent flexible substrate is provided having a thin, transparent, electrically conductive surface. At least one photoconductive layer is then applied to the electrically conductive surface. An optional thin charge blocking layer may be applied to the electrically conductive layer prior to the application of the photoconductive layer. If desired, an optional adhesive layer may be utilized between the charge blocking layer and the photoconductive layer. For multilayered photoreceptors, a charge generation layer is usually applied onto the blocking layer and charge transport layer is formed on the charge generation layer.

The substrate is substantially transparent and may comprise numerous suitable materials having the required mechanical properties. Accordingly, the substrate may comprise a layer of an electrically nonconductive or conductive material such as an inorganic or an organic composition. As electrically non-conducting materials there may be employed various resins known for this purpose including polyesters, polycarbonates, polyamides, polyurethanes, and the like which are flexible as thin webs. The electrically insulating or conductive substrate should be flexible and in the form of a flexible web. Preferably, the flexible web substrate comprises a commercially available biaxially oriented polyester known as Mylar, available from E. I. du Pont de Nemours & Co. or Melinex available from ICI.

The thickness of the substrate layer depends on numerous factors, including beam strength and economical considerations, and thus this layer for a flexible belt may be of substantial thickness, for example, about 125 micrometers, or of minimum thickness less than 50 micrometers, provided there are no adverse effects on the final electrostatographic device. In one flexible belt embodiment, the thickness of this layer ranges from about 65 micrometers to about 150 micrometers, and preferably from about 75 micrometers to about 100 micrometers for optimum flexibility and minimum stretch. The surface of the substrate layer is preferably cleaned prior to coating to promote greater adhesion of the deposited coating. Cleaning may be effected, for example, by exposing the surface of the substrate layer to plasma discharge, ion bombardment and the like.

The conductive layer may vary in thickness over substantially wide ranges depending on the optical transparency and degree of flexibility desired for the electrostatographic member. Accordingly, the thickness of the conductive layer may be between about 20 angstroms and about 750 angstrom, and more preferably from about 100 Angstrom units to about 200 angstrom units for an optimum combination of electrical conductivity, flexibility and light transmission. The flexible conductive layer may be an electrically conductive metal layer formed, for example, on the substrate by any suitable coating technique, such as a vacuum depositing technique. Typical metals include aluminum, zirconium, niobium, tantalum, vanadium and hafnium, titanium, nickel, stainless steel, chromium, tungsten, molybdenum, and the like. Typical vacuum depositing techniques include sputtering, magnetron sputtering, RF sputtering, and the like.

If desired, an alloy of suitable metals may be deposited. Typical metal alloys may contain two or more metals such as zirconium, niobium, tantalum, vanadium and hafnium, titanium, nickel, stainless steel, chromium, tungsten, molybdenum, and the like, and mixtures thereof. Regardless of the technique employed to form the metal layer, a thin layer of metal oxide forms on the outer surface of most metals upon exposure to air. Thus, when other layers overlying the metal layer are characterized as "contiguous" layers, it is intended that these overlying contiguous layers may, in fact, contact a thin metal oxide layer that has formed on the outer surface of the oxidizable metal layer. Generally, for rear erase exposure, a conductive layer light transparency of at least about 15 percent is desirable. The conductive layer need not be limited to metals. Other examples of conductive layers may be combinations of materials such as conductive Indium tin oxide or carbon black loaded polymer with low carbon black concentration as a transparent layer for light having a wavelength between about 4000 Angstroms and about 7000 Angstroms. A typical electrical conductivity for conductive layers for electrophotographic imaging members in slow speed copiers is about $10^2$ to $10^3$ ohms/square.

After formation of an electrically conductive surface, a hole blocking layer may be applied thereto. Generally, electron blocking layers for positively charged photoreceptors allow holes from the imaging surface of the photoreceptor to migrate toward the conductive layer. Any suitable blocking layer capable of forming an electronic barrier to holes between the adjacent photoconductive layer and the underlying conductive layer may be utilized. The blocking layer may be nitrogen containing siloxanes or nitrogen containing titanium compounds such as trimethoxysilyl propylene diamine, hydrolyzed trimethoxysilyl propyl ethylene diamine, N-beta-(aminoethyl) gamma-amino-propyl trimethoxy silane, isopropyl 4-aminobenzene sulfonyl, di(dodecylbenzene sulfonyl) titanate, isopropyl di(4-aminobenzoyl)isostearoyl titanate, isopropyl tri(N-ethylaminoethylamino)titanate, isopropyl trianthranil titanate, isopropyl tri(N,N-dimethyl-ethylamino)titanate, titanium-4-amino benzene sulfonat oxyacetate, titanium 4-aminobenzoate isostearate oxyacetate, $[H_2N(CH_2)_4]CH_3Si(OCH_3)_2$, (gamma-aminobutyl) methyl diethoxysilane, and $[H_2N(CH_2)_3]CH_3Si(OCH_3)_2$ (gamma-aminopropyl) methyl diethoxysilane, as disclosed in U.S. Pat. Nos. 4,291,110, 4,338,387, 4,286,033 and 4,291,110. The disclosures of U.S. Pat. Nos. 4,338,387, 4,286,033 and 4,291,110 are incorporated herein in their entirety. A preferred blocking layer comprises a reaction product between a hydrolyzed silane and the oxidized surface of a metal ground plane layer. The oxidized surface inherently forms on the outer surface of most metal ground plane layers when exposed to air after deposition. The blocking layer may be applied by any suitable conventional technique such as spraying, dip coating, draw bar coating, gravure coating, silk screening, air knife coating, reverse roll coating, vacuum deposition, chemical treatment and the like. For convenience in obtaining thin layers, the blocking layers are preferably applied in the form of a dilute solution, with the solvent being removed after deposition of the coating by conventional techniques such as by vacuum, heating and the like. The blocking layer should be continuous and have a thickness of less than about 0.2 micrometer because greater thicknesses may lead to undesirably high residual voltage.

An optional adhesive layer may applied to the hole blocking layer. Any suitable adhesive layer well known in the art may be utilized. Typical adhesive layer materials include, for example, polyesters, duPont 49,000 (available from E. I. duPont de Nemours and Company), Vitel PE-100 (available from Goodyear Tire & Rubber), polyurethanes, and the like. Satisfactory results may be achieved with adhesive layer thickness between about 0.05 micrometer (500 angstroms) and about 0.3 micrometer (3,000 angstroms). Conventional techniques for applying an adhesive layer coating mixture to the charge blocking layer include spraying, dip coating, roll coating, wire wound rod coating, gravure coating, Bird applicator coating, and the like. Drying of the deposited coating may be effected by any suitable conventional technique such as oven drying, infra red radiation drying, air drying and the like.

Any suitable photogenerating layer may be applied to the adhesive blocking layer which can then be overcoated with a contiguous hole transport layer as described hereinafter. Examples of typical photogenerating layers include inorganic photoconductive particles such as amorphous selenium, trigonal selenium, and selenium alloys selected from the group consisting of selenium-tellurium, selenium-tellurium-arsenic, selenium arsenide and mixtures thereof, and organic photoconductive particles including various phthalocyanine pigment such as the X-form of metal free phthalocyanine described in U.S. Pat. No. 3,357,989, metal phthalocyanines such as vanadyl phthalocyanine and copper phthalocyanine, dibromoanthanthrone, squarylium, quinacridones available from DuPont under the tradename Monastral Red, Monastral violet and Monastral Red Y, Vat orange 1 and Vat orange 3 trade names for dibromo anthanthrone pigments, benzimidazole perylene, substituted 2,4-diamino-triazines disclosed in U.S. Pat. No. 3,442,781, polynuclear aromatic quinones available from Allied Chemical Corporation under the tradename Indofast Double Scarlet, Indofast Violet Lake B, Indofast Brilliant Scarlet and Indofast Orange, and the like dispersed in a film forming polymeric binder. Multi-photogenerating layer compositions may be utilized where a photoconductive layer enhances or reduces the properties of the photogenerating layer. Examples of this type of configuration are described in U.S. Pat. No. 4,415,639, the entire disclosure of this patent being incorporated herein by reference. Other suitable photogenerating materials known in the art may also be utilized, if desired. Charge generating binder layers comprising particles or layers comprising a photoconductive material such as vanadyl phthalocyanine, metal free phthalocyanine, benzimidazole perylene, amorphous selenium, trigonal selenium, selenium alloys such as selenium-tellurium, selenium-tellurium-arsenic, selenium arsenide, and the like and mixtures thereof are especially preferred because of their sensitivity to white light. Vanadyl phthalocyanine, metal free phthalocyanine and tellurium alloys are also preferred because these materials provide the additional benefit of being sensitive to infrared light.

Any suitable polymeric film forming binder material may be employed as the matrix in the photogenerating binder layer. Typical polymeric film forming materials include those described, for example, in U.S. Pat. No. 3,121,006, the entire disclosure of which is incorporated herein by reference. Thus, typical organic polymeric film forming binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrene-butadiene copolymers, vinylidenechloride-vinylchloride copolymers, vinylacetate-vinylidenechloride copolymers, styrene-alkyd resins, polyvinylcarbazole, and the like. These polymers may be block, random or alternating copolymers.

The photogenerating composition or pigment is present in the resinous binder composition in various amounts, generally, however, from about 5 percent by volume to about 90 percent by volume of the photogenerating pigment is dispersed in about 10 percent by volume to about 95 percent by volume of the resinous binder, and preferably from about 20 percent by volume to about 30 percent by volume of the photogenerating pigment is dispersed in about 70 percent by volume to about 80 percent by volume of the resinous binder composition. In one embodiment about 8 percent by volume of the photogenerating pigment is dispersed in about 92 percent by volume of the resinous binder composition.

The photogenerating layer containing photoconductive compositions and/or pigments and the resinous binder material generally ranges in thickness of from about 0.1 micrometer to about 5.0 micrometers, and preferably has a thickness of from about 0.3 micrometer to about 3 micrometers. The photogenerating layer thickness is related to binder content. Higher binder content compositions generally require thicker layers for photogeneration. Thickness outside these ranges can be selected providing the objectives of the present invention are achieved.

Any suitable and conventional technique may be utilized to mix and thereafter apply the photogenerating layer coating mixture. Typical application techniques include spraying, dip coating, roll coating, wire wound rod coating, and the like. Drying of the deposited coating may be effected by any suitable conventional technique such as oven drying, infra red radiation drying, air drying and the like.

The active charge transport layer may comprise an activating compound useful as an additive dispersed in electrically inactive polymeric materials making these materials electrically active. These compounds may be added to polymeric materials which are incapable of supporting the injection of photogenerated holes from the generation material and incapable of allowing the transport of these holes therethrough. This will convert the electrically inactive polymeric material to a material capable of supporting the injection of photogenerated holes from the generation material and capable of allowing the transport of these holes through the active layer in order to discharge the surface charge on the active layer. A typical transport layer employed in one of the two electrically operative layers in multilayered photoconductors comprises from about 25 percent to about 75 percent by weight of at least one charge transporting aromatic amine compound, and about 75 percent to about 25 percent by weight of a polymeric film forming resin in which the aromatic amine is soluble. The charge transport layer forming mixture may, for example, comprise an aromatic amine compound of one or more compounds having the general formula:

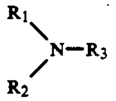

wherein $R_1$ and $R_2$ are an aromatic group selected from the group consisting of a substituted or unsubstituted phenyl group, naphthyl group, and polyphenyl group and $R_3$ is selected from the group consisting of a substituted or unsubstituted aryl group, alkyl group having from 1 to 18 carbon atoms and cycloaliphatic compounds having from 3 to 18 carbon atoms. The substituents should be free form electron withdrawing groups such as $NO_2$ groups, CN groups, and the like. Examples of charge transporting aromatic amines represented by the structural formulae above for charge transport layers capable of supporting the injection of photogenerated holes of a charge generating layer and transporting the holes through the charge transport layer include triphenylmethane, bis(4-diethylamine-2-methylphenyl) phenylmethane; 4'-4''-bis(diethylamino)-2',2''-dimethyltriphenylmethane, N,N'-bis(alkylphenyl)-[1,1'-biphenyl]-4,4'-diamine wherein the alkyl is, for example, methyl, ethyl, propyl, n-butyl, etc., N,N'-diphenyl-N,N'-bis(chlorophenyl)-[1,1'-biphenyl]-4,4'-diamine, N,N'-diphenyl-N,N'-bis(3''-methylphenyl)-(1,1'-biphenyl)-4,4'-diamine, and the like dispersed in an inactive resin binder.

Any suitable inactive resin binder soluble in methylene chloride or other suitable solvent may be employed in the photoreceptor. Typical inactive resin binders soluble in methylene chloride include polycarbonate resin, polyvinylcarbazole, polyester, polyarylate, polyacrylate, polyether, polysulfone, and the like. Molecular weights can vary, for example, from about 20,000 to about 150,000.

Any suitable and conventional technique may be utilized to mix and thereafter apply the charge transport layer coating mixture to the charge generating layer. Typical application techniques include spraying, dip coating, roll coating, wire wound rod coating, extrusion die coating and the like. Drying of the deposited coating may be effected by any suitable conventional technique such as oven drying, infra red radiation drying, air drying and the like.

Generally, the thickness of the hole transport layer is between about 10 to about 50 micrometers, but thicknesses outside this range can also be used. The hole transport layer should be an insulator to the extent that the electrostatic charge placed on the hole transport layer is not conducted in the absence of illumination at a rate sufficient to prevent formation and retention of an electrostatic latent image thereon. In general, the ratio of the thickness of the hole transport layer to the charge generator layer is preferably maintained from about 2:1 to 200:1 and in some instances as great as 400:1.

Examples of photosensitive members having at least two electrically operative layers include the charge generator layer and diamine containing transport layer members disclosed in U.S. Pat. Nos. 4,265,990, 4,233,384, 4,306,008, 4,299,897 and 4,439,507. The disclosures of these patents are incorporated herein in their entirety. The photoreceptors may comprise, for example, a charge generator layer sandwiched between a conductive surface and a charge transport layer as described above or a charge transport layer sandwiched between a conductive surface and a charge generator layer.

Optionally, an overcoat layer may also be utilized to improve resistance to abrasion. In some cases an anti-curl back coating may be applied to the side opposite the photoreceptor to provide flatness and/or abrasion resistance. These overcoating and anti-curl back coating layers are well known in the art and may comprise thermoplastic organic polymers or inorganic polymers that are electrically insulating or slightly semiconductive. Overcoatings are continuous and generally have a thickness of less than about 10 micrometers. The thickness of anti-curl backing layers should be sufficient to substantially balance the total forces of the layer or layers on the opposite side of the supporting substrate layer. The total forces are substantially balanced when the belt has no noticeable tendency to curl after all the layers are dried. An example of an anti-curl backing layer is described in U.S. Pat. No. 4,654,284 the entire disclosure of this patent being incorporated herein by reference. A thickness between about 70 and about 160 micrometers is a satisfactory range for flexible photoreceptors.

The substantially transparent conductive electrode formed on the upper surface of the photoreceptor may be formed by any suitable technique. A preferred technique is to vapor deposit it in any suitable conventional, commercially available vacuum apparatus. More specifically, the photoreceptor is mounted in a vacuum chamber and a suitable conductive material can be vapor deposited onto the photoreceptor surface through a mask to form a substantially transparent electrode of having an area, for example of between about 0.25 $cm^2$ and about 5 $cm^2$s. Typical electrically conductive materials include gold, aluminum, silver, indium; tin oxide and the like.

The photoreceptor sample to be tested along with the electrical contacts may be enclosed in any suitable sealable, gas tight chamber such as an oven for tests in an artifical atmosphere (i.e. an atmosphere other than ambient). If desired, other components of the test circuit may also be enclosed in the chamber so long as the components are not adversely affected by the conditions prevailing in the chamber during testing. If desired, the chamber may be equipped with suitable inlet and outlet fittings to remove and/or introduce heated or unheated gases, humidified air, and the like. The atmosphere within the chamber in which the photoreceptor is mounted during measurement can be changed by flowing the appropriate gases through the fittings employing any suitable means such as conventional flow meters and control valves. The gases (e.g. nitrogen or argon) are commerically available. A flow rate of between about 5 and about 100 cubic centimeters per minute ensures positive pressure within the chamber. If desired, the temperature within the chamber may be controlled by any suitable means such as inserting a conventional heating means such as a resistance wire heater into the chamber or placing the photoreceptor in a commerically available oven such as a Delta oven.

The processes and apparatus of this invention can rapidly test photoreceptors under different cycling conditions that does not require extensive machine testing, nor extensive scanner testing, nor numerous reports from repairmen in the field. The simple, rapid tests of this invention can, for example, be changed rapidly without the need for moving or changing hardware. Moreover, the tests preformed with the process and apparatus of this invention are more accurate and free of dilution by unrelated effects due to machine interactions occurring in machine testing.

A number of examples are set forth hereinbelow and are illustrative of different compositions and conditions that can be utilized in practicing the invention. All proportions are by weight unless otherwise indicated. It will be apparent, however, that the invention can be practiced with many types of compositions and can have many different uses in accordance with the disclosure above and as pointed out hereinafter.

In Examples II through XIII, the following components were utilized connected as illustrated in FIG. 4.

A Xerox 6065 Personal Computer, based on an Intel 8086 microprocessor and equipped with 8087 arithmetic coprocessor operated with an 8 MHz clock. The graphic display was 640×400 pixels on the screen.

An EPSON FX-85 printer.

A Data Translation 2801 data acquisition board.

A TREK bipolar operational amplifier/power supply 2500 V. Model 609A.

A TREK ion coupled electrostatic voltmeter Model 565.

Two General Radio strobes Model 1538-A. One is sufficient for cycling, Q-V, and discharge vs. exposure measurements, if back erase is not required. Quantum efficiency measurements required two strobes because expose and erase plus intensities were vastly different.

A Keithley Model 616 Electrometer modified to allow instrument reset by a digital local signal. This modification was implemented by adding an external BNC connector wired to the reset switch. The instrument reset was accomplished internally by applying 5 V, which is compatible with the logic level signals.

A sample holder box with high voltage relay, 500 megohms and 10 megohms (for electrometer protection) resistors, beam splitter, and Hamamatsu S1337-66BO photodiode for on line light intensity measurements. The calibration implemented in the programs was based on the use of Hamamatsu S1337-66BO photodiode. Beam splitting was effected using thin glass microscope cover slides. Relevant constants were obtained from diagrams supplied in the manufacturer's catalog.

For high voltage switching, a Jennings FT3A-26S high voltage relay was used.

Potter & Brumfield relay JMF-1080-61 was used to short the photodiode.

The programs to control electroded xerographic measurements included various executable files for:

Performing repeated xerographic cycling on a sample while measuring the sample's voltage characteristics, Measuring inputed expose and erase light intensities, Replot data of previously acquired measurements, Measuring Q - V curves of a photoreceptor, Options for measuring discharge vs. exposure curves, quantum efficiency (QE) as a function of voltage (Vddp), and QE as a function of exposure wavelength (action spectra), and Calibrating the system.

The program for performing repeated xerographic cycling on a sample while measuring the sample's voltage characteristics and displays the data in graphical form as they are acquired and stores them on disk for future reference and more detailed analysis. The program utilizes a menu containing a variety of parameters which can be changed to control the operation of the program, such as the one in FIG. 4. These parameters are described below. To change any of the parameters, the new value of the parameter is entered to replace the old parameter. A Charging Time menu item specifies how long the voltage is to be applied for if in the constant-voltage mode, and if in constant-current mode it specifies the period of time over which the charge is to be applied. In the constant-voltage mode this parameter can assume a wide range of values since samples usually charge fully within a few milliseconds. A Dark Decay parameter menu item determines the number of milliseconds for which the sample will be permitted to decay in darkness before the first light pulse. A First Interval parameter controls the amount of time allotted between the expose pulse and the start of the erase pulse. A Second Interval parameter specifies the time between the start of the erase pulse and the end of the cycle. A Number of Erase Pulses menu item is capable of using either one or two different strobes. In both cases, a first strobe is flashed once for the expose pulse. If this is the only strobe hooked up, the option "Number of Erase Pulses" on the menu is set to however many times the strobe is to be flashed for the erase pulse. There is a twelve milliseconds delay between each strobe flash during the erase pulse to allow the strobe's capacitor to recharge, and the time required for these flashes will be overlapped with the second interval. If two strobes are hooked up, a choice of generating the erase pulse from either of the strobes are menu items. The Number of Cycles option is a menu time for specifying how many xerographic cycle are to be performed. A 'Type of Charging' parameter menu item permits switching between constant-current and constant-voltage modes. If this parameter is altered, the large resistor (FIG. 4) is shorted for constant-voltage charging or not shorted for constant-current charging. Depending on how this parameter is set, the following menu item parameter will be either 'Charge' or 'Voltage', allowing entry of either the amount of charge to be placed on the sample in constant-current mode, or the applied voltage in constant-voltage mode. A Maximum Expected Voltage menu option affects only the scale used in graphing the measured voltages. Normally it is set to an Automatic mode in which the computer selects an appropriate voltage scale. By selecting this option, the computer's choice can be overridden to allow use of selected voltage scale. A Beam Splitter menu option is set according to which photodiode is connected. If set to 'Yes', the diode using the beam splitter will be assumed to be connected; if 'No', it will be assumed the diode is positioned in place of the sample.

Choice of how data sent to the computer is plotted is also available through various menu items. Selection of a QV program menu item generates plots of voltage versus charge by applying gradually incrementing amounts of charge to the sample and flashing the erase strobe in between cycles. The data is displayed in graphical form as they are taken and stored to disk for furture reference. A Charging Time menu items specifies the period of time over which the charge is to be deposited. A Dark Decay readings menu option allows specification of up to five points in time at which the dark decay voltage may be plotted. A Number of Cycles menu option allows the number of data points taken and plotted to be specified. A Charge Steps menu option specifies how much the charge is to be increased by on each cycle. A Number of Strobe Pulses option specifies the number of times the strobe will be flashed during the erase pulse. Selection of a QE program menu item measures the quantum efficiency (QE) of photocarrier generation in the photoreceptor and discharge versus exposure curves. The coulomb meter is connected to a photodiode to measure light intensity. The sample terminal previously connected to coulomb meter is grounded. The quantum efficiency is taken to be proportional to the ratio of the voltage drop on the sample due to the initial small light pulse (expose) divided by the amount of light used. QE is plotted in either of two ways as function of sample voltage after dark decay (Vddp), in which case the computer varies the applied voltage in between each cycle; or as a function of wavelength (action spectrum), in which case the user must manually change the filters and type in the filter's wavelength in between each cycle. Applied Voltage menu items control the voltage or charge the sample is to be charged. The inital applied voltage or charge, the voltage or charge increment (positive or negative), and the final voltage or charge are entered.

EXAMPLE I

Three photoreceptor devices were fabricated as follows:

Device No. 1: A photoreceptor was prepared by forming coatings using conventional techniques on a substrate comprising vacuum deposited titanium layer on a polyethylene terephthalate film (Melinex, available from E. I. duPont de Nemours & Co.). The first coating was a siloxane barrier layer formed from hydrolyzed gamma aminopropyltriethoxysilane having a thickness of 100 angstroms. The second coating was an adhesive layer of polyester resin (49,000, available from E. I. duPont de Nemours & Co.) having a thickness of 50 angstroms. A 0.5 micrometer thick amorphous selenium layer was vacuum deposited on the adhesive layer. A transport layer was coated with a solution containing one gram of N,N'-diphenyl-N,N'-bis(3-methyl-phenyl)-(1,1'biphenyl)-4,4'-diamine and one gram of polycarbonate resin, a poly(4,4'-isopropylidenediphenylene) carbonate (Makrolon®, available from Farbenfabricken Bayer A. G.), dissolved in 11.5 grams of methylene chloride solvent using a Bird coating applicator. The N,N'-diphenyl-N,N'-bis(3-methyl-phenyl)-(1,1'biphenyl)-4,4'-diamine is an electrically active aromatic diamine charge transport small molecule whereas the polycarbonate resin is an electrically inactive film forming binder. N,N'-diphenyl-N,N'-bis(3-methyl-phenyl)-(1,1'biphenyl)-4,4'-diamine has the formula:

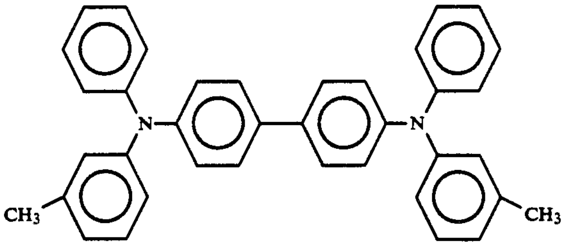

The coated device was dried at 35° C. under vacuum for 12 hours to form a 25 micrometer thick charge transport layer. A vacuum chamber was employed to deposit a semitransparent gold electrode having a 0.33 square cm area on top of the device.

Device No. 2: A photoreceptor was prepared by forming coatings using conventional techniques on a substrate comprising vacuum deposited titanium layer on a polyethylene terephthalate film (Melinex®, available from E. I. duPont de Nemours & Co.). The first coating was a siloxane barrier layer formed from hydrolyzed gamma aminopropyltriethoxysilane having a thickness of 100 angstroms. The second coating was an adhesive layer of polyester resin (49,000, available from E. I. duPont de Nemours & Co.) having a thickness of 50 angstroms. The next coating was a charge generator layer containing 35 percent by weight vanadyl phthalocyanine particles dispersed in a polyester resin (Vitel® PE100, available from Goodyear Tire and Rubber Co.) having a thickness of 1 micrometer. The transport layer consisted of 50 weight percent N,N'-diphenyl-N,N'-bis(3-methyl-phenyl)-(1,1'biphenyl)-4,4'-diamine and 50 weight percent polycarbonate resin a poly(4,4'-isopropylidene-diphenylene) carbonate (Makrolon®, available from Farbenfabricken Bayer A. G.) applied as a solution in methylene chloride. The coated device was heated in a vacuum oven maintained at 80° C. to form a charge transport layer having a thickness of 25 micrometers. A vacuum chamber was employed to deposit a semitransparent gold electrode having a 0.33 square cm area on top of the device.

Device No. 3: A photoreceptor was prepared by forming coatings using conventional techniques on a substrate comprising vacuum deposited titanium layer on a polyethylene terephthalate film (Melinex®, available from E. I. duPont Nemours & Co.). The first coating was a siloxane barrier layer formed from hydrolyzed gamma aminopropyltriethoxysilane having a thickness of 100 angstroms. The second coating was an adhesive layer of polyester resin (49,000, available from E. I. dePont de Nemours & Co.) having a thickness of 50 angstroms. The next coating was a charge generator layer coated from a solution containing 0.8 gram trigonal selenium having a particle size of about 0.05 micrometer to 0.2 micrometers and about 0.8 gram poly(N-vinyl carbazole) in about 7 milliliters of tetrahydrofuran and about 7 milliliters toluene. The generator layer coating was applied with a 0.005 inch Bird applicator and the layer was dried at about 135° C. in a forced air oven to form a layer having a 1.6 micrometer thickness. The transport layer consisted of 50 weight percent N,N'-diphenyl-N,N'-bis(3-methyl-phenyl)-(1,1'biphenyl)-4,4'-diamine and 50 weight percent polycarbonate resin a poly(4,4'-isopropylidene-diphenylene) carbonate (Makrolon®, available from Farbenfabricken Bayer A. G.) applied as a solution in methylene chloride. The coated device was heated in a vacuum oven maintained at 80° C. to form a charge transport layer having a thickness of 25 micrometers. A vacuum chamber was employed to deposit a semitransparent gold electrode having a 0.33 square cm area on top of the device.

EXAMPLE II

Dark decay measurements were carried out on Device No. 1 (described in Example I) as follows. The device was mounted in an enclosed chamber and connected to the circuit described in FIG. 4. The 500 megohm resistor was shorted and a computer menu dealing with the dark decay measurements was called up. The menu was used to set the timing sequences for the charging duration (relay closure time), the time between opening of the relay and the onset of the exposure flash, the time duration between the exposure flash and the erase flash, and the time duration between the erase flash and the closure of the relay for the next cycle. These timings were set at 100, 1,000, 1,000 and 300 milliseconds, respectively. The menu was also used to set the starting voltage voltage steps and the final voltage. These were set 100, 100 and 1,600 volts respectively. The menu was also used to set the number of cycles at each voltage setting at 4 cycles. The front exposure flash intensity was adjusted to provide 5 ergs/cm$^2$ light through the gold electrode. The rear erase flash intensity was adjusted to a value of 1,000 ergs/cm$^2$ incident on the rear of the device. The experiment was carried out and the data plotted. A dark decay of 10 volts per second was measured at an applied voltage of 1,000 volts.

EXAMPLE III

Dark decay measurements were carried out in Device No. 2 (described in Example I) employing the procedure and timings described in Example II. A dark decay of 50 volts per second was measured at an applied voltage of 1,000 volts.

EXAMPLE IV

Dark decay measurements were carried out in Device No. 3 (described in Example I) employing the procedure and timings described in Example II. A dark decay of 100 volts per second was measured at an applied voltage of 1,000 volts.

EXAMPLE V

Dark decay measurements were carried out on Device No. 1 with a different set of timings than that described in Example II. The device was mounted in an enclosed chamber and connected to the circuit described in FIG. 4. The 500 megohm resistor was shorted and a menu dealing with the dark decay measurements was called up on the computer. The menu was used to set the timing sequences for the charging duration (relay closure time), the time between opening of the relay and the onset of the exposure flash, the time duration between the exposure flash and the erase flash, and the time duration between the erase flash and the closure of the relay for the next cycle. These timings were set at 5,000, 2,000, 1,000 and 300 milliseconds, respectively. The timings were easily changed as opposed to a conventional scanner where probes must be physically moved to accomplish this procedure. Also, a charging time of 5000 milliseconds requires the use of very wide corotrons in conventional scanners employing corotrons. The menu was also used to set the starting voltage, voltage steps and the final voltage. These were set 100, 100 and 1,600 volts respectively. The menu was also used to set the setting of the number of cycles at each voltage setting. This was set at 4 cycles. The front exposure flash intensity was adjusted to provide 5 ergs/cm$^2$ light through the gold electrode. The rear erase flash intensity was adjusted to a value of 1,000 ergs/cm$^2$ incident on the rear of the device. The experiment was carried out and the data plotted. A dark decay of 10 volts per second was measured at an applied voltage of 1,000 volts.

EXAMPLE VI

Dark decay measurements were carried out in Device No. 2 (described in Example I) employing the procedure and timings described in Example V. A dark decay of 20 volts per second was measured at an applied voltage of 1000 volts.

EXAMPLE VII

Dark decay measurements were carried out in Device No. 3 (described in Example I) employing the procedure and timings described in Example V. A dark decay of 30 volts per second was measured at an applied voltage of 1,000 volts.

EXAMPLE VIII

Charge-voltage (QV) measurements were performed on Device No. 1 (described in Example I) as follows. The device was mounted in an enclosed chamber and connected to the circuit described in FIG. IV. The short across the 500 megohm resistor was removed and a menu dealing with the QV measurements was called up on the computer. The menu was used to set the timing sequences for the charging duration (relay closure time), the time between opening of the relay and the onset of the exposure flash, the time duration between the exposure flash and the erase flash, and the time duration between the erase flash and the closure of the relay for the next cycle. The timings were set at 100, 1,000, 1,000 and 300 milliseconds, respectively. The menu also allowed the setting of the starting charge, charge steps and the final charge, all in nano coulombs. These were set 3, 3 and 90 nanocoulombs, respectively. The menu also facilitated the setting of the number of cycles at each coulomb setting. This was set at 4 cycles. The front exposure flash intensity was adjusted to provide 5 $ergs/cm^2$ light through the gold electrode. The rear erase flash intensity was adjusted to a value of 1,000 $ergs/cm^2$ incident on the rear of the device. The experiment was carried out and the data plotted. A voltage of 1,150 volts was measured at a charge of 40 nanocoulombs.

EXAMPLE IX

QV measurements were carried out in Device No. 2 (described in Example I) employing the procedure and timings described in Example VIII. A voltage of 1,100 volts was measured at a charge of 40 nanocoulombs.

EXAMPLE X

QV measurements were carried out in Device No. 3 (described in Example I) employing the procedure and timings described in Example VIII. A voltage of 1,000 volts was measured at a charge of 40 nanocoulombs.

EXAMPLE XI

Cyclic stability measurements at constant voltage were carried out on Device No. 1 (described in Example I) as follows. The device was mounted in an enclosed chamber and connected to the circuit described in FIG. IV. The 500 megohm resistor was shorted and a menu dealing with the cyclic measurements was called up. The menu was used to set the timing sequences for the charging duration (relay closure time), the time between opening of the relay and the onset of the exposure flash, the time duration between the exposure flash and the erase flash and the time duration between the erase flash and the closure of the relay for the next cycle. These timings were set at 100, 1,000, 1,000 and 300 milliseconds, respectively. The menu also facilitated the setting of the voltage setting at which the experiment has to be carried out. This was set at 1,000 volts. The menu also facilitated the setting of the number of cycles. This was set at 50,000 cycles. The front exposure flash intensity was adjusted to provide 5 $ergs/cm^2$ light through the gold electrode. The rear erase flash intensity was adjusted to a value of 1,000 $ergs/cm^2$ incident on the rear of the device. The experiment was carried out and the data plotted. A dark decay of 10 volts per second was measured at an applied voltage of 1,000 volts at cycle 1. This remained at 10 volts at 50,000 cycles.

EXAMPLE XII

Cyclic stability measurements at constant voltage were carried out in Device No. 2 (described in Example I) employing the procedure described in Example XI. A dark decay of 50 volts per second at an applied voltage of 1000 volts was measured at cycle 1. This increased to 100 volts in 50,000 cycles.

EXAMPLE XIII

Cyclic stability measurements at constant voltage were carried out in Device No. 3 (described in Example I) employing the procedure described in Example XI. A dark decay of 100 volts per second at an applied voltage of 1000 volts was measured at cycle 1. This increased to 200 volts in 50,000 cycles.

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. Apparatus for ascertaining electrical discharge properties of an electrophotographic imaging member comprising (a) a light tight housing comprising at least two separable sections (b) a transparent platen supported in said housing, (c) means in said housing to flatten a flexible electrophotographic imaging member comprising a substantially transparent electrically conductive layer and at least one photoconductive layer against said transparent platen, (d) means for applying an electric potential or electric current to a substantially transparent electrode on said electrophotographic imaging member to form an electric field across said photoconductive layer in said housing, (e) means for terminating said applying of said electric potential or said electric current, (f) an electrostatic voltmeter probe coupled to said means for applying an electric potential to said electrode, (g) means for exposing said photoconductive layer to activating radiation through said substantially transparent electrode on said electrophotographic imaging member to discharge said electrophotographic imaging member to a predetermined level, and (h) means for exposing said photoconductive layer to activating radiation through said substantially transparent electrically conductive layer to fully discharge said electrophotographic imaging member.

2. A process for ascertaining electrical discharge properties of an electrophotographic imaging member comprising the steps of (a) providing at least one electrophotographic imaging member comprising an electrically conductive layer and at least one photoconductive layer, (b) contacting the surface of said electrophotographic imaging member at a specific location on said surface with a substantially transparent electrode and applying an electric potential or applying an electric current to form an electric field across said photoconductive layer, (c) terminating said applying of said electric potential or said electric current, (d) exposing said photoconductive layer to activating radiation through said substantially transparent electrode to discharge said electrophotographic imaging member, (e) repeating steps (b), (c) and (d), at said specific location on said surface and (f) measuring the potential across said photoconductive layer during steps (b), (c) and (d) as a function of time by means of an electrostatic meter coupled to said electrode.

3. A process according to claim 2 including measuring the difference between the potential while applying an electric potential and the potential remaining at a predetermined time after said terminating of said applying of said electric potential.

4. A process according to claim 2 including measuring the potential across said photoconductive layer remaining as a function of light intensity incident during said exposing of said photoconductive layer to activating radiation to discharge said electrophotographic imaging member.

5. A process according to claim 2 including altering the wavelength of said activating radiation while maintaining the number of photons constant in step (c) when conducting step (e) and measuring the potential across said photoconductive layer remaining as a function of light wavelength incident during repeated exposing of said photoconductive layer to activating radiation to discharge said electrophotographic imaging member.

6. A process according to claim 2 including measuring the change during cycling of the difference between the potential while applying an electric potential, and the potential remaining at a predetermined time after said terminating of said applying of said electric potential.

7. A process according to claim 2 including measuring the change during cycling in the charge flowing through said photoconductive layer during the application of said potential.

8. A process according to claim 2 including measuring the charge flowing through said photoconductive layer during the application of said potential.

9. A process according to claim 2 including measuring the change during cycling of the potential at a predetermined time after said exposing of said photoconductive layer to activating radiation to discharge said electrophotographic imaging member.

10. A process according to claim 2 including measuring changes in electrical discharge properties of an electrophotographic imaging member while changing ambient conditions during cycling.

11. A process according to claim 2 including conducting said steps in an airtight enclosure with an artifical atmosphere.

12. A process according to claim 2 including conducting said steps while maintaining said electrophotographic imaging member at a preselected temperature.

13. A process for ascertaining electrical discharge properties of an electrophotographic imaging member comprising the steps of (a) providing at least one electrophotographic imaging member comprising an electrically conductive layer and at least one photoconductive layer, (b) contacting the surface of said electrophotographic imaging member at a specific location on said surface with a substantially transparent electrode and applying an electric current to form an electric field across said photoconductive layer, (c) terminating said applying of said electic current, (d) exposing said photoconductive layer to activating radiation through said substantially transparent electrode to discharge said electrophotographic imaging member, (e) repeating steps (b), (c) and (d) at said specific location on said surface, and (f) measuring the potential across said photoconductive layer during steps (b), (c) and (d) as a function of time by means of an electrostatic meter coupled to said electrode.

14. A process according to claim 13 including measuring the difference between the potential after the termination of the application of the electric current and the remaining potential at a predetermined time after said terminating of said applying of said electric current.

15. A process according to claim 13 including measuring the potential across said photoconductive layer remaining as a function of light intensity incident during said exposing of said photoconductive layer to activating radiation to discharge said electrophotgraphic imaging member.

16. A process according to claim 13 including altering the wavelength of said activating radiation while maintaining the number of photons constant in step (c) when conducting step (e) and measuring the potential across said photoconductive layer remaining as a function of light wavelength incident during repeated exposing of said photoconductive layer to activating radiation to discharge said electrophotographic imaging member.

17. A process according to claim 13 including measuring the change during cycling of the potential after said terminating of said applying of said electric current.

18. A process according to claim 13 including measuring the change during cycling of the difference between the potential after said terminating of said application of the electric current, and the potential remaining at a predetermined time after said terminating of said applying of said electric current.

19. A process for according to claim 13 including measuring the change during cycling of the potential at a predetermined time after said exposing of said photoconductive layer to activating radiation to discharge said electrophotographic imaging member.

20. A process for according to claim 13 including measuring changes in electrical discharge properties of an electrophotographic imaging member while changing ambient conditions during cycling.

21. A process for according to claim 13 including conducting said steps in an airtight enclosure with an artifical atmosphere.

22. A process for according to claim 13 including conducting said steps while maintaining said electrophotographic imaging member at a preselected temperature.

23. Apparatus for ascertaining electrical discharge properties of an electrophotographic imaging member comprising (a) means to support an electrophotographic imaging member comprising an electrically conductive layer and at least one photoconductive layer, (b) means for applying an electric potential or electric current to a substantially transparent electrode at a specific location on said surface on said electrophotographic imaging member to form an electric field across said photoconductive layer, (c) means for terminating said applying of said electric potential or said electric current, (d) an electrostatic voltmeter probe coupled to said means for applying an electric current to said electrode, (e) means for exposing said photoconductive layer through said substantially transparent electrode to activating radiation at said specific location on said surface on said electrophotographic imaging member to discharge said electrophotographic imaging member to a predetermined level, and (f) means for exposing said photoconductive layer to activating radiation to fully discharge said electrophotographic imaging member.

24. Apparatus according to claim 23 including a coulomb meter adapted to measure the charge flowing through said electrically conductive layer.

25. Apparatus according to claim 23 wherein said electrode on said electrophotographic imaging member is a substantially transparent electrically conductive electrode in pressure contact with said electrophotographic imaging member.

26. Apparatus according to claim 23 wherein said electrode on said electrophotographic imaging member is a substantially transparent electrically conductive electrode deposited on said electrophotographic imaging member.

27. Apparatus according to claim 23 wherein said means for applying an electric potential includes a constant voltage source.

28. Apparatus according to claim 23 wherein said means for applying an electric potential includes a constant current source.

29. Apparatus according to claim 23 including sensor means to detect the light intensity of said means for exposing said photoconductive layer to said activating radiation to discharge said electrophotographic imaging member to a predetermined level.

30. Apparatus according to claim 23 including a gas tight housing for enclosing said electrphotographic imagin member.

31. Apparatus according to claim 30 including inlet means for introducing a gas into said gas tight housing.

32. Apparatus according to claim 30 including means to control the temperature within said gas tight housing.

33. Apparatus according to claim 30 including means to control the humidity within said gas tight housing.

* * * * *